United States Patent
Fukumoto

(10) Patent No.: US 10,826,350 B2
(45) Date of Patent: Nov. 3, 2020

(54) POWER GENERATOR AND ELECTRONIC DEVICE

(71) Applicant: MITSUMI ELECTRIC CO., LTD., Tokyo (JP)

(72) Inventor: Hiroyuki Fukumoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 341 days.

(21) Appl. No.: 15/851,027

(22) Filed: Dec. 21, 2017

(65) Prior Publication Data

US 2018/0183300 A1    Jun. 28, 2018

(30) Foreign Application Priority Data

Dec. 27, 2016    (JP) .................................. 2016-253687

(51) Int. Cl.
*H02K 7/18*    (2006.01)
*H02K 35/02*    (2006.01)
*H02K 7/06*    (2006.01)

(52) U.S. Cl.
CPC ............. *H02K 7/1853* (2013.01); *H02K 7/06* (2013.01); *H02K 35/02* (2013.01)

(58) Field of Classification Search
CPC ........ H02K 33/00; H02K 33/02; H02K 35/00; H02K 35/02; H02K 7/1853; H02K 7/06; H02K 33/04; H02K 33/06; H02K 33/08; H02K 33/10
USPC .............................................. 310/21, 32, 36
See application file for complete search history.

(56) References Cited

U.S. PATENT DOCUMENTS

| | | | | |
|---|---|---|---|---|
| 1,053,107 | A * | 2/1913 | Milton | H02K 33/16 310/36 |
| 3,980,908 | A * | 9/1976 | McClintock | G03B 7/083 396/465 |
| 5,565,769 | A * | 10/1996 | Mehnert | G01B 7/30 324/207.15 |
| 2008/0174188 | A1* | 7/2008 | Cederwall | H02K 35/02 310/36 |

(Continued)

FOREIGN PATENT DOCUMENTS

CN    104 953 783 A    9/2015
CN    104953783 A   *  9/2015

(Continued)

OTHER PUBLICATIONS

Liao (CN 104953783 A) English Translation (Year: 2015).*
European Search Report, 17210609.8, dated Feb. 5, 2018, 9 pages.

*Primary Examiner* — Tulsidas C Patel
*Assistant Examiner* — Robert E Mates
(74) *Attorney, Agent, or Firm* — Miller Nash Graham & Dunn LLP

(57) ABSTRACT

A power generator 100 includes a case 110, a coil 121 fixedly provided in the case 110, magnets 151*a*, 151*b* provided in the case 110 so that the magnets 151*a*, 151*b* can be relatively rotated and moved with respect to the coil 121 around a predetermined rotational axis 140, an operating portion 130 which is provided so that the operating portion 130 can be pivotally moved with respect to the case 110 and pivotally operated to apply the external force and an elastic member (a torsion spring) 160 for storing the external force applied through the operating portion 130 as elastic energy and releasing the stored elastic energy to relatively rotate and move the magnets 151*a*, 151*b* with respect to the coil 121.

10 Claims, 12 Drawing Sheets

(56) References Cited

U.S. PATENT DOCUMENTS

2015/0013560 A1* 1/2015 Schlenter .............. F42C 11/008
102/202.14

FOREIGN PATENT DOCUMENTS

| | | |
|---|---|---|
| CN | 105 471 218 A | 4/2016 |
| EP | 1 936 787 A1 | 6/2008 |
| JP | S58-72361 | 4/1983 |
| JP | S59-3629 U | 1/1984 |
| JP | 2004-201376 A | 7/2004 |
| JP | 2011-172391 A | 9/2011 |
| WO | 2008/148904 A1 | 12/2008 |

* cited by examiner

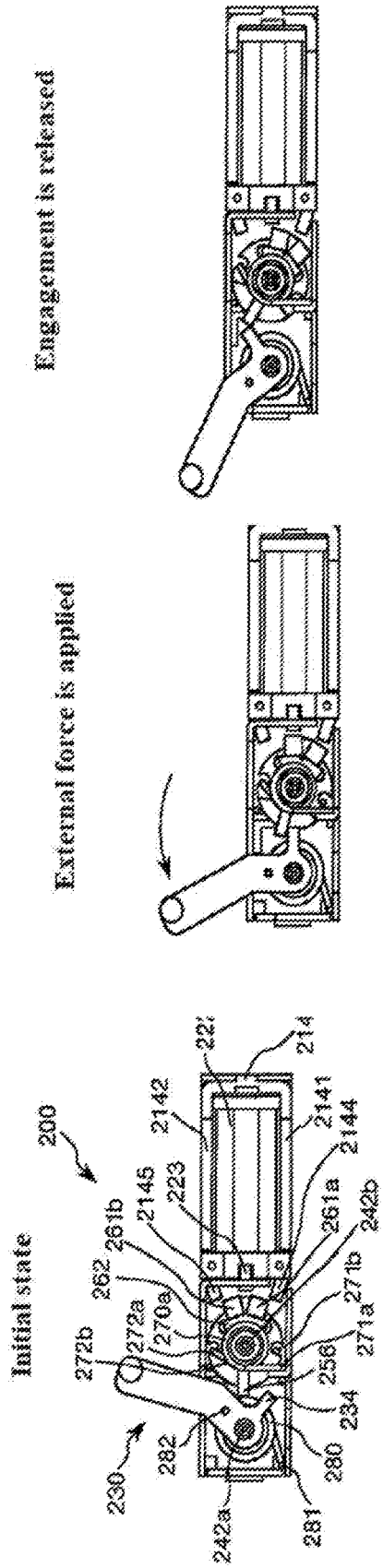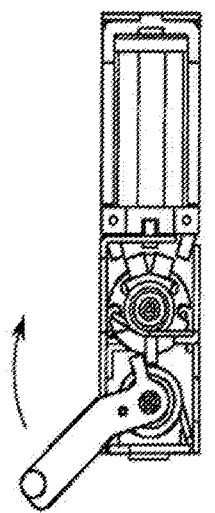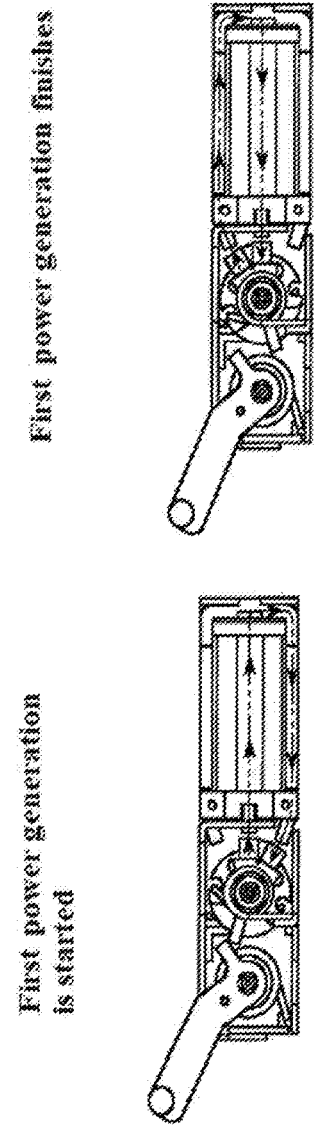
FIG. 14A  FIG. 14B  FIG. 14C
FIG. 14D  FIG. 14E  FIG. 14F

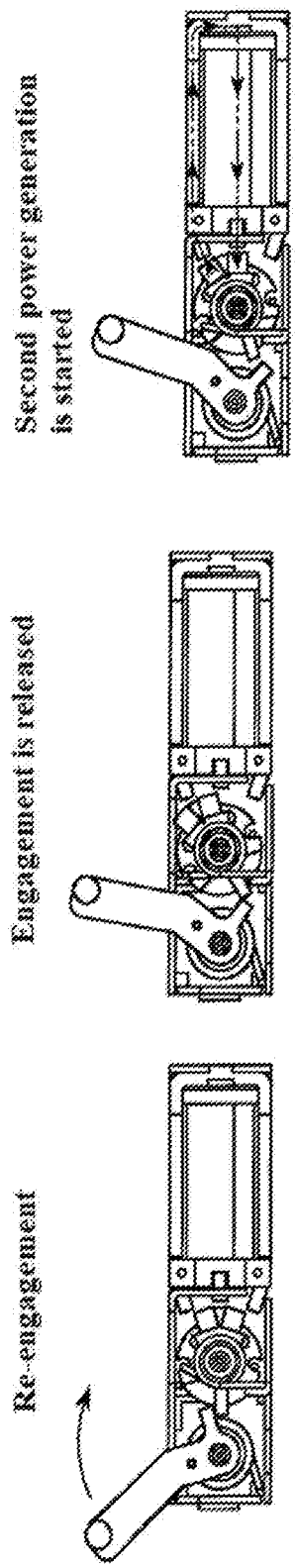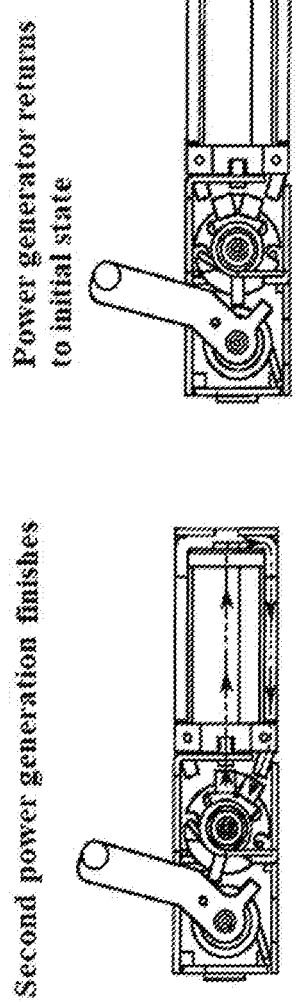

POWER GENERATOR AND ELECTRONIC DEVICE

TECHNICAL FIELD

The present disclosure generally relates to power generators and electronic devices, in particular to a power generator which generates electric power which can generate electric power by utilizing external force applied through an operating portion and an electronic device including the power generator.

BACKGROUND

Due to the current advance in science and technology, power saving of an electronic circuit has been progressed. Thus, it becomes possible to generate electric power by utilizing small external force applied from an outside such as external force applied by a switching operation by an operator and external force applied from a vibrating body such as a duct and external force applied through switching operation by an operator and use the generated electric power to drive an electronic circuit.

SUMMARY

The present embodiments have been made in view of the conventional problems mentioned above. Accordingly, it is an object of the present embodiments to provide a power generator which can stably provide electric power with a sufficient amount and an electronic device including the power generator.

The above object is achieved by the present embodiments defined in the following (1) to (13).

(1) A power generator for generating electric power by utilizing external force, comprising:
 a case;
 a coil fixedly provided in the case;
 at least one magnet provided in the case so that the magnet can be relatively rotated and moved with respect to the coil around a predetermined rotational axis; an operating portion which is provided so that the operating portion can be pivotally moved with respect to the case and pivotally operated to apply the external force; and an elastic member for storing the external force applied through the operating portion as elastic energy and releasing the stored elastic energy to relatively rotate and move the magnet with respect to the coil,
 wherein the power generator is configured to generate the electric power when the magnet is relatively rotated and moved with respect to the coil around the predetermined rotational axis.

(2) The power generator according to the above (1), wherein the magnet takes a closest position with respect to the coil when a speed of rotational movement of the magnet due to the elastic member becomes substantially maximum.

(3) The power generator according to the above (2), further comprising a magnetic core inserted in a central hollow portion of the coil, wherein an end surface of the magnet approximately horizontally faces an end surface of the magnetic core when the speed of the rotational movement of the magnet becomes substantially maximum.

(4) The power generator according to the above (2) or (3), wherein the speed of the rotational movement of the magnet when the magnet takes the closest position with respect to the coil is equal to or more than 80% of a maximum speed of the rotational movement of the magnet.

(5) The power generator according to any one of the above (1) to (4), wherein the case has an external core portion which is constituted of a pair of plate-like portions facing each other and a connecting portion for connecting the pair of plate-like portions and formed with a magnetic material, and
 wherein the coil is provided between the pair of plate-like portions of the external core portion.

(6) The power generator according to the above (5), wherein the at least one magnet contains two magnets supported so as to be relatively rotated and moved with respect to the coil around the predetermined rotational axis, and
 wherein the two magnets are provided so that one of the two magnets takes a closest position with respect to an end portion of one of the pair of plate-like portions of the external core portion when the other one of the two magnets takes a closest position with respect to the coil.

(7) The power generator according to the above (6), wherein each of the pair of plate-like portions of the case is configured so that the one of the two magnets faces the end portion of the one of the pair of plate-like portions when the other one of the two magnets takes a closest position with respect to the coil.

(8) The power generator according to any one of the above (1) to (7), further comprising a yoke provided so as to be relatively rotated and moved with respect to the coil together with the at least one magnet around the predetermined rotational axis,
 wherein the at least one magnet is provided on the yoke.

(9) The power generator according to the above (1), wherein the magnet is attached to a rotating member provided so as to be rotated by the operating portion, wherein the operating portion is configured to engage with the rotating member while the magnet is rotated and moved in a first direction by rotation of the rotating member to reach a first engagement release position and release engagement with the rotating member when the magnet reaches the first engagement release position, and
 wherein the elastic member is configured to store the elastic energy while the magnet is rotated and moved in the first direction by the rotation of the rotating member and release the elastic member to rotate and move the magnet when the engagement between the operating portion and the rotating member is released.

(10) The power generator according to the above (9), wherein the operating portion can be pivotally moved so as to return to a predetermined initial position after the engagement between the operating portion and the rotating member has been released.

(11) The power generator according to the above (10), wherein the operating portion is configured to again engage with the rotating member to rotate the rotating member in a second direction opposite to the first direction when the operating portion is pivotally moved so as to return to the predetermined initial position, and
 wherein the operating portion is configured to engage the rotating member while the magnet is rotated and moved in the second direction by rotation of the rotating member in the second direction to reach a second engagement release position and release engagement with the rotating member when the magnet reaches the second engagement release position.

(12) The power generator according to the above (11), wherein the elastic member is configured to store elastic energy while the magnet is rotated and moved in the second direction by the rotation of the rotating member and release the elastic energy to rotate and move the magnet when the engagement between the operating portion and the rotating member is released.

(13) An electronic device comprising:
the power generator defined in any one of the above (1) to (12); and
an electronic circuit driven by the power generator.

Effects of the Embodiments

The power generator of the present embodiments utilizes the elastic member for storing the applied external force as the elastic energy and releasing the stored elastic energy to relatively rotate and move the magnet with respect to the coil around the predetermined rotational axis. Since the elastic energy stored in the elastic member and released from the elastic member is sufficiently large, it is possible to provide the electric power with the amount enough to drive the electronic circuit by utilizing one time of relative movement (rotational movement) of the magnet with respect to the coil even if the magnet is not reciprocated with respect to the coil. Further, since it is possible to provide the electric power with the amount enough to drive the electronic circuit by utilizing one time of the relative movement (the rotational movement) of the magnet with respect to the coil, it becomes unnecessary to boost the voltage obtained by the power generator of the present embodiments and rectify the current obtained by the power generator of the present embodiments. Thus, it is possible to prevent the amount of the obtained electric power from being unstable due to the energy loss at the time of rectifying the current and boosting the voltage.

Further, since the elastic energy stored in the elastic member and released from the elastic member does not depend on the operating speed of the operating portion by the operator, it is possible to utilize always constant force to rotate and move the magnet with respect to the coil. Thus, the speed of the rotational movement of the magnet with respect to the coil becomes stable, thereby stabilizing the amount of the electric power generated by the power generator of the present embodiments.

BRIEF DESCRIPTION OF THE DRAWINGS

FIG. 7A is a top view of the power generator in an initial state. FIG. 7B is the top view of the power generator in a state that external force is applied to the operating portion. FIG. 7C is the top view of the power generator when the power generation of the power generator is started. FIG. 7D is the top view of the power generator at the time when the power generation of the power generator finishes. FIG. 7E is the top view of the power generator at the time when rotational movement of magnets with respect to a coil is stopped. FIG. 7F is the top view of the power generator when the power generator returns to the initial state.

FIG. 8A is a graph for explaining the variation of the rotational speed of the magnet during the motion of the power generator shown in FIGS. 7A-F. FIG. 8B is a view showing a state that the power generation of the power generator is started. FIG. 8C is a view showing a state that the power generation of the power generator finishes.

FIGS. 14A-F are views for explaining motion of the power generator shown in FIG. 9. FIG. 14A is a top view of the power generator in an initial state. FIG. 14B is the top view of the power generator in a state that external force is applied to an operating portion. FIG. 14C is the top view of the power generator when engagement between an engaging portion of the operating portion and an engaging portion of the rotating member is released. FIG. 14D is the top view of the power generator when first power generation is started. FIG. 14E is the top view of the power generator when the first power generation finishes. FIG. 14F is the top view of the power generator in a state that the engaging portion of the operating portion again engages with the engaging portion of the rotating member.

FIGS. 15A-E are other views for explaining the motion of the power generator shown in FIG. 9. FIG. 15A is the top view of the power generator in a state that the engaging portion of the operating portion again engages with the engaging portion of the rotating member. FIG. 15B is the top view of the power generator when the engagement between the engaging portion of the operating portion and the engaging portion of the rotating member is released. FIG. 15C is the top view of the power generator when second power generation is started. FIG. 15D is the top view of the power generator when the second power generation finishes. FIG. 15E is the top view of the power generator when the power generator returns to the initial state.

DETAILED DESCRIPTION OF THE PREFERRED EMBODIMENTS

Hereinafter, description will be given to a power generator and an electronic device including the power generator of the present embodiments based on preferred embodiments shown in the accompanying drawings.

First Embodiment

Figure 1:
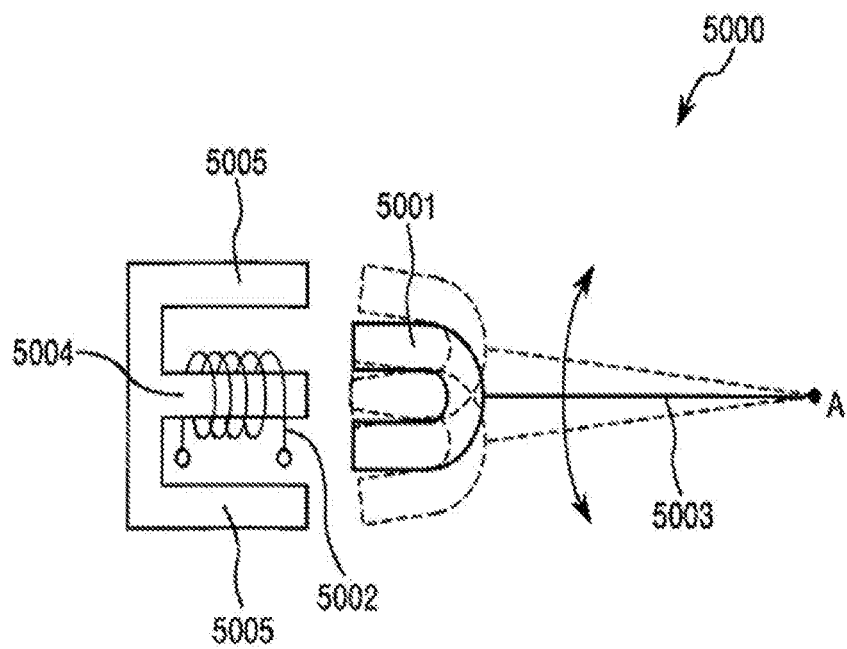
FIG. 1 is a view showing a configuration of a conventional power generator.
Figure 2:
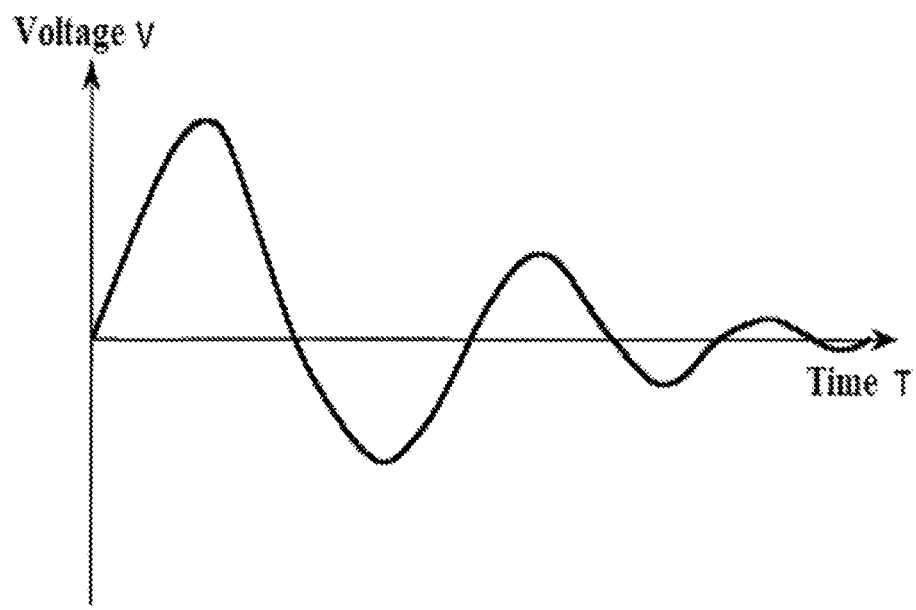
FIG. 2 is a view showing a voltage generated in a coil by reciprocal motion of a magnet in the conventional power generator shown in FIG. 1.
Figure 3:
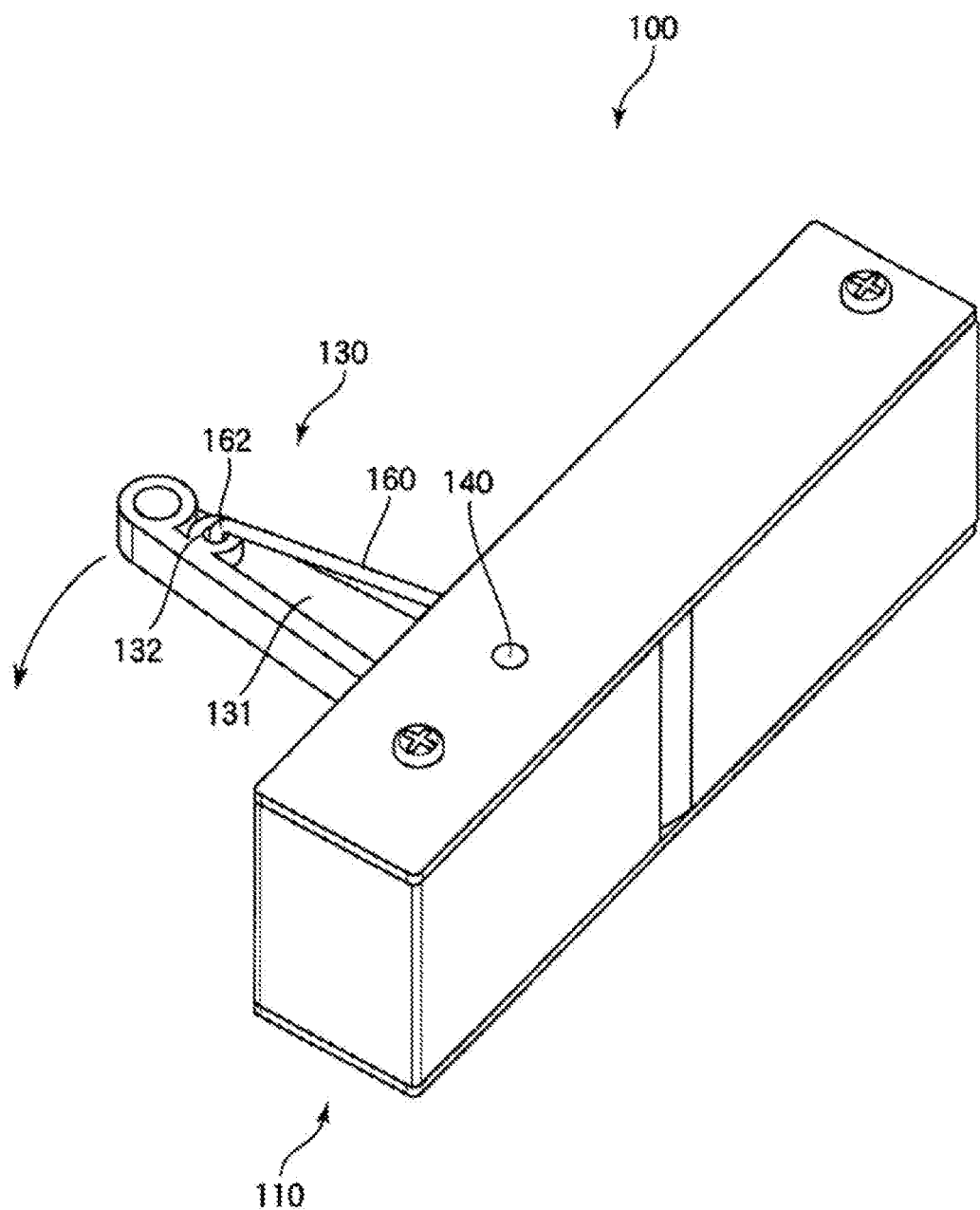
FIG. 3 is a perspective view showing an external view of a power generator according to a first embodiment of the present embodiments.
Figure 4:
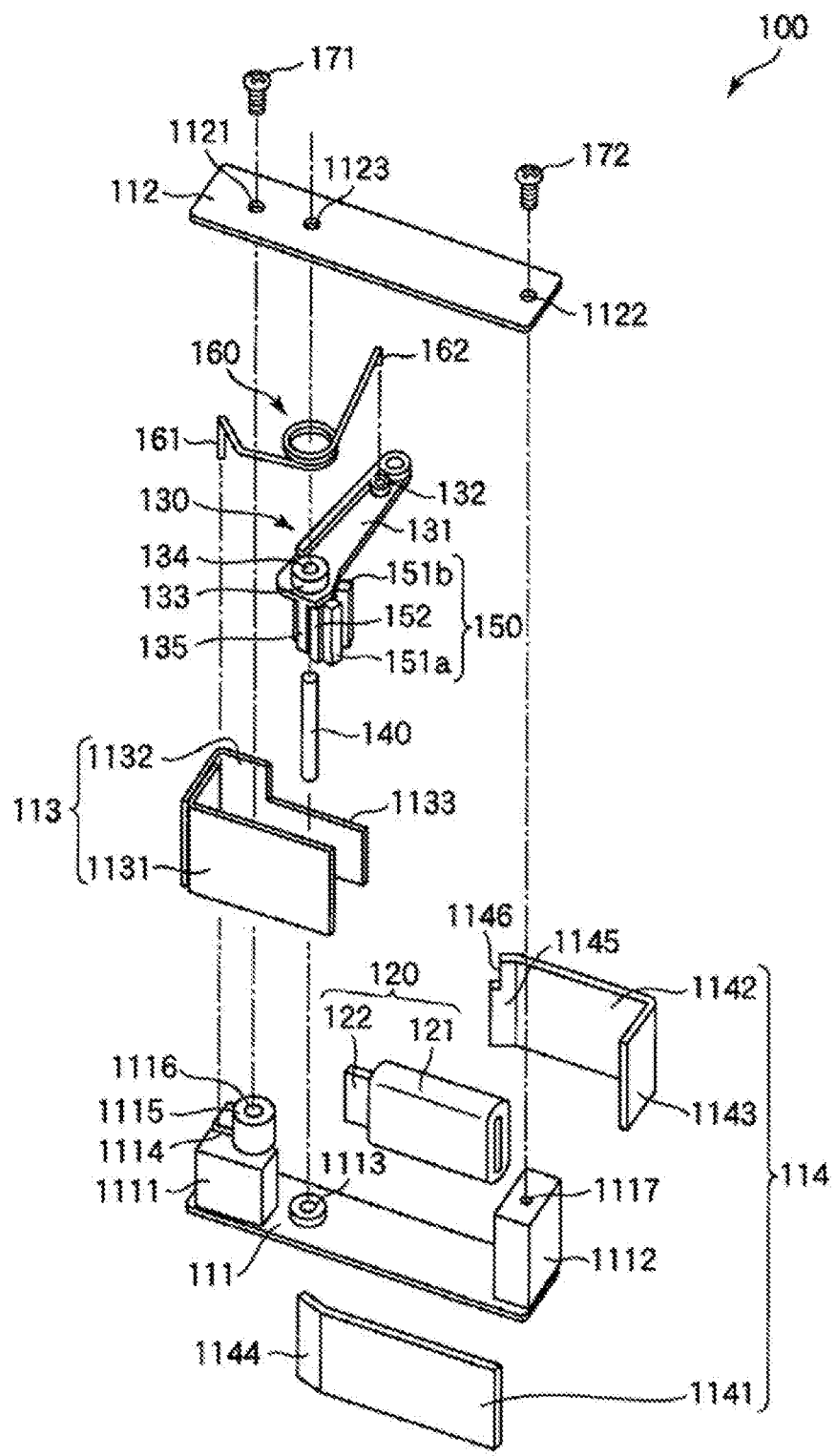
FIG. 4 is an exploded perspective view of the power generator shown in FIG. 3.
Figure 5:
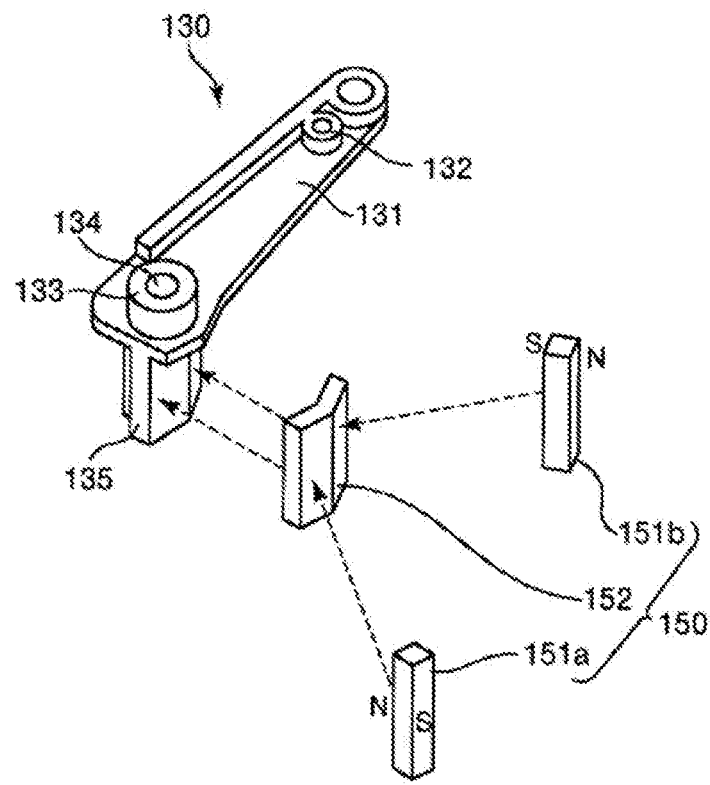
FIG. 5 is a view showing an operating portion and a magnet assembly of the power generator shown in FIG. 3.
Figure 6:
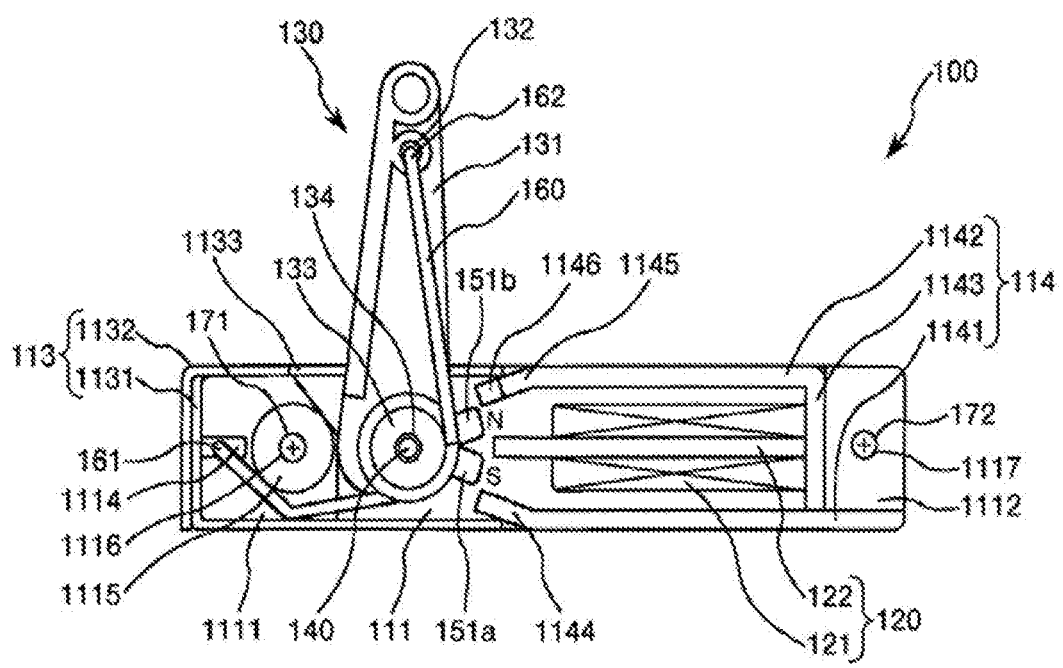
FIG. 6 is a top view showing an internal structure of the power generator shown in FIG. 3.

First, a power generator according to a first embodiment of the present invention will be described in detail with reference to FIGS. 3 to 8. FIG. 3 is a perspective view showing an external view of the power generator according to the first embodiment of the present invention. FIG. 4 is an exploded perspective view of the power generator shown in FIG. 3. FIG. 5 is a view showing an operating portion and a magnet assembly of the power generator shown in FIG. 3. FIG. 6 is a top view showing an internal structure of the power generator shown in FIG. 3. FIGS. 7A-F are views for explaining motion of the power generator shown in FIG. 3. FIGS. 8A-C are a graph and views showing a variation of a rotational speed of the magnet during the motion of the power generator shown in FIGS. 7A-F. In this regard, in FIG. 6, an upper plate of the power generator is omitted for showing the internal structure of the power generator.

Hereinafter, an upper side in each of FIGS. 3, 4 and 5 is referred to as "upper" or "upper side", a lower side in each of FIGS. 3, 4 and 5 is referred to as "lower" or "lower side", a left side in each of FIGS. 3, 4 and 5 is referred to as "left" or "left side" and a right side in each of FIGS. 3, 4 and 5 is referred to as "right" or "right side". Further, a rear side of the paper in each of FIGS. 3, 4 and 5 is referred to as "rear side" and a front side of the paper in each of FIGS. 3, 4 and 5 is referred to as "front side".

In substance, a power generator 100 shown in FIGS. 3 and 4 includes a case 110 for containing each component of the power generator 100, a coil assembly 120 including a coil 121 fixedly provided in the case 110, an operating portion 130 which is provided so that the operating portion 130 can be pivotally moved with respect to the case 110 and pivotally operated around a predetermined axis (a predetermined rotational axis) 140 to apply external force, a magnet assembly 150 including a first magnet 151a and a second magnet 151b provided in the case 110 so that the first magnet 151a and the second magnet 151b can be relatively rotated and moved with respect to the coil 121 around the predetermined axis 140 and a torsion spring (an elastic member) 160 for storing the external force applied through the operating portion 130 as elastic energy and releasing the stored elastic energy to relatively rotate and move the magnets 151a, 151b with respect to the coil 121.

As shown in FIG. 3, in a state that the power generator 100 has been assembled, an arm portion 131 of the operating portion 130 protrudes from the case 110 toward the left-rear side. The operator (such as a user and other devices for applying the external force to the power generator 100) applies the external force to pivotally move the operating portion 130 in a direction indicated by an arrow line in FIG. 3. When the external force is applied to the power generator 100, the power generator 100 can generate electric power by utilizing the applied external force and supply the generated electric power to an electronic circuit (not shown in the drawings) provided outside the power generator 100 through terminals (not shown in the drawings). The electric power supplied to the electronic circuit is used for driving the electronic circuit.

More specifically, the power generator 100 is configured to relatively rotate and move the magnets 151a, 151b with respect to the coil 121 around the predetermined axis 140 by utilizing the external force applied through the operating portion 130 to vary a density of magnetic flux (lines of magnetic force) generated from the magnets 151a, 151b and passing through the coil 121, thereby generating the electric power.

Hereinafter, each component of the power generator 100 will be described in detail.

Case 110

The case 110 is an elongated box-like member (with a size of about 8 mm width×about 12 mm height×about 33 mm length, for example) for containing each component of the power generator 100. The case 110 includes a lower plate 111, an upper plate 112, a movable portion containing portion 113 for containing movable portions (the operating portion 130, the axis 140, the magnet assembly 150 and the torsion spring 160) of the power generator 100 and an external core portion 114 which contains the coil assembly 120 and serves as an external core for the coil 121.

The lower plate 111 is an elongated plate-like member serving as a base plate for the entire of the power generator 100. A first base 1111, a second base 1112 and a bearing portion 1113 for supporting the axis 140 are provided on the lower plate 111.

As shown in FIG. 4, the first base 1111 is provided on a left-side portion of an upper surface of the lower plate 111. The first base 1111 has a rectangular parallelepiped shape whose corner on the right-rear side in FIG. 4 is chamfered and is fixed on the lower plate 111. In the state shown in FIG. 6 in that the power generator 100 has been assembled, side surfaces of the first base 1111 on the left side, the upper side and the lower side in FIG. 6 make contact with an inner surface of the movable portion containing portion 113 of the case 110 and a side surface of the first base 1111 on the right side in FIG. 6 faces the operating portion 130.

Referring back to FIG. 4, a concave portion 1114 for receiving one end portion 161 of the torsion spring 160 and a columnar body 1115 on which a first female screw portion 1116 to be screwed with a first male screw 171 is formed are provided on an upper surface of the first base 1111.

As shown in FIG. 6, the concave portion 1114 is formed on a left-side portion of an upper surface of the first base 1111 and the columnar body 1115 is provided on the right side of the concave portion 1114. Further, a total height of the first base 1111 and the columnar body 1115 is substantially equal to a height of the movable portion containing portion 113 and a height of the external core portion 114. Thus, in the state in that the power generator 100 has been assembled, an upper surface of the columnar body 1115 and upper end portions of the movable portion containing portion 113 and the external core portion 114 are positioned on the substantially same plane.

The second base 1112 is provided on a right-side portion of the upper surface of the lower plate 111. The second base 1112 has a rectangular parallelepiped shape and fixed on the lower plate 111. In the state shown in FIG. 6 in that the power generator 100 has been assembled, side surfaces of the second base 1112 on the left side and the lower side in FIG. 6 make contact with the external core portion 114 of the case 110 and side surfaces of the second base 1112 on the right side and the upper side in FIG. 6 are expose to an outside.

Referring back to FIG. 4, a second female screw portion 1117 to be screwed with a second male screw 172 is formed on an upper surface of the second base 1112. A height of the second base 1112 is substantially equal to the height of the movable portion containing portion 113 and the height of the external core portion 114. Thus, in the state shown in FIG. 6 in that the power generator 100 has been assembled, the upper surface of the second base 1112 and the upper end portions of the movable portion containing portion 113 and the external core portion 114 are positioned on the substantially same plane.

The bearing portion 1113 is provided at a position on the upper surface of the lower plate 111 between the first base 1111 and the second base 1112 and closer to the side of the first base 1111. The bearing portion 1113 is configured to support a lower end portion of the axis 140 serving as a rotational axis for rotational movement of the magnet assembly 150 (the magnets 151a, 151b) with respect to the coil 121.

The upper plate 112 is an elongated plate-like member serving as a cover for the entire of the power generator 100. A shape of the upper plate 112 is substantially equal to the shape of the lower plate 111. The upper plate 112 includes a first insertion hole 1121 through which the first male screw 171 is inserted, a second insertion hole 1122 through which the second male screw 172 is inserted and a third insertion hole 1123 for supporting an upper end portion of the axis 140.

The first insertion hole 1121 is formed at a position corresponding to the first female screw portion 1116 of the first base 1111 on the lower plate 111. The second insertion hole 1122 is formed at a position corresponding to the second female screw portion 1117 of the second base 1112 on the lower plate 111. The third insertion hole 1123 is formed at a position corresponding to the bearing portion 1113 on the lower plate 111.

In a state that each component of the power generator 100 is contained in the case 110, by screwing the first male screw 171 with the first female screw portion 1116 of the first base 1111 on the lower plate 111 with passing through the first insertion hole 1121 of the upper plate 112 and screwing the second male screw 172 with the second female screw portion 1117 of the second base 1112 on the lower plate 111 with passing through the second insertion hole 1122 of the upper plate 112, it is possible to assemble the power generator 100.

The movable portion containing portion 113 includes a first L-shaped portion 1131 and a second L-shaped portion 1132. In the state shown in FIG. 6 in that the power generator 100 has been assembled, the movable portions (the operating portion 130, the axis 140, the magnet assembly 150 and the torsion spring 160) of the power generator 100 are contained between the first L-shaped portion 1131 and the second L-shaped portion 1132.

Each of the first L-shaped portion 1131 and the second L-shaped portion 1132 is an L-shaped plate-like member whose longer side portion and shorter side portion form a right angle. The shorter side portions of the first L-shaped portion 1131 and the second L-shaped portion 1132 are connected with each other to form the movable portion containing portion 113 having a U-like shape opening toward the right side.

Further, a cutout portion 1133 is formed in a right and upper-side portion of the longer side portion of the second L-shaped portion 1132. In the state shown in FIG. 6 in that the power generator 100 has been assembled, the arm portion 131 of the operating portion 130 protrudes toward the outside of the case 110 through the cutout portion 1133.

In this embodiment, although the first L-shaped portion 1131 and the second L-shaped portion 1132 are different components, the present embodiments is not limited thereto. For example, the first L-shaped portion 1131 and the second L-shaped portion 1132 may be integrally formed as one component. Further, the movable portion containing portion 113 may be fixed on the lower plate 111 with a bonding method due to an adhesive agent or the like. Alternatively, the lower plate 111 and the movable portion containing portion 113 may be formed integrally with each other.

Examples of a constitutional material for the lower plate 111, the upper plate 112 and the movable portion containing portion 113 of the case 110 described above include a non-magnetic material such as a ceramic material, a resin material and a carbon material and a weekly magnetic material. In the case of using the ceramic material as the constitutional material, it becomes easier to form the lower plate 111, the upper plate 112 and the movable portion containing portion 113. Further, from viewpoints of cost and weight, it is preferable to form the lower plate 111, the upper plate 112 and the movable portion containing portion 113 with the resin material. Each of the lower plate 111, the upper plate 112 and the movable portion containing portion 113 may be formed with the same non-magnetic material or the same weakly magnetic material or may be formed with different kinds of the non-magnetic material or the weakly magnetic material.

The external core portion 114 includes a first plate-like portion 1141, a second plate-like portion 1142 facing the first plate-like portion 1141 and a connecting portion 1143 connecting the first plate-like portion 1141 and the second plate-like portion 1142. In the state shown in FIG. 6 in that the power generator 100 has been assembled, the coil assembly 120 (the coil 121) is contained between the first plate-like portion 1141 and the second plate-like portion 1142.

Each component (the first plate-like portion 1141, the second plate-like portion 1142 and the connecting portion 1143) of the external core portion 114 is formed with a magnetic material and serves as an external core for the coil assembly 120 (the coil 121). Examples of the magnetic material for forming the external core portion 114 include a ferritic stainless steel (for example, JIS SUS 430), a martensitic stainless steel (for example, JIS SUS 403), a pure iron (for example, JIS SUY), a soft iron, a carbon steel, a magnetic steel (a silicon steel), a high-speed tool steel, a structural steel (for example, JIS SS 400), a permalloy and a combination of two of more of these materials. Among them, it is especially preferable to form the external core portion 114 with the ferritic stainless steel having a superior strength and corrosion resistance. Each component of the external core portion 114 may be formed with the same magnetic material or may be formed with different kinds of the magnetic material.

Since each component of the external core portion 114 is formed with the magnetic material, each component of the external core portion 114 can serve as a part of a magnetic circuit in which the magnetic flux (the lines of magnetic force) generated from the magnets 151a, 151b and passing through the coil 121 flows.

The first plate-like portion 1141 is an elongated plate-like member. A first bent portion 1144 is formed at a left-side end of the first plate-like portion 1141. The first bent portion 1144 is formed by bending the left-side end of the first plate-like portion 1141 toward the inner side (the rear side in FIG. 4). Further, the first bent portion 1144 is configured so that a left-side end portion of the first bent portion 1144 faces an end portion of the first magnet 151a or an end portion of the second magnet 151b during motion of the power generator 100 described with reference to FIGS. 7A-F.

The second plate-like portion 1142 is an elongated plate-like member which is the substantially same as the first plate-like portion 1141. A second bent portion 1145 is formed at a left-side end of the second plate-like portion 1142. The second bent portion 1145 is formed by bending the left-side end of the second plate-like portion 1142 toward the inner side (the front side in FIG. 4). Further, the second bent portion 1145 is configured so that a left-side end portion of the second bent portion 1145 faces the end portion of the first magnet 151a or the end portion of the second magnet 151b during the motion of the power generator 100 described with reference to FIGS. 7A-F.

Further, a cutout portion 1146 is formed in a left and upper portion of the second bent portion 1145 for allowing the arm portion 131 of the operating portion 130 to escape in the cutout portion 1146 during the motion of the power generator 100 described with reference to FIGS. 7A-F.

In this regard, although the connecting portion 1143 is formed integrally with the second plate-like portion 1142 in this embodiment, the present embodiments is not limited thereto. For example, the connecting portion 1143 may be formed integrally with the first plate-like portion 1141 or may be formed as a different component from the first plate-like portion 1141 and the second plate-like portion 1142. Alternatively, the first plate-like portion 1141, the second plate-like portion 1142 and the connecting portion 1143 may be integrally formed with each other. Further, the external core portion 114 is fixed on the lower plate 111 with a bonding method due to an adhesive agent or the like.

Coil Assembly 120

The coil assembly 120 includes the coil 121 and a magnetic core 122 inserted into a central hollow portion of the coil 121. When the magnets 151*a*, 151*b* relatively moves with respect to the coil 121, the number of the lines of magnetic force (the density of the magnetic flux) passing through the coil 121 varies, thereby generating the electric power in the coil 121. Both end portions of the coil 121 (power lead wires) are connected to the electronic circuit (not shown in the drawings) provided outside the power generator 100 and the electric power generated in the coil 121 is supplied to the electronic circuit through the power lead wires, and thereby the electronic circuit is driven by the supplied electronic power.

The coil assembly 120 is fixedly arranged on the lower plate 111 of the case 110. In the state shown in FIG. 6 in that the power generator 100 has been assembled, the coil assembly 120 is positioned between the first plate-like portion 1141 and the second plate-like portion 1142 of the external core portion 114 of the case 110. A method for fixedly arranging the coil assembly 120 on the lower plate 111 of the case 110 is not particularly limited to a specific method. It is possible to fixedly arrange the coil assembly 120 on the lower plate 111 with a bonding method due to an adhesive agent, a thermal fusion method, a fixing method due to a fixing tool such as a screw and a combination of two or more of these methods.

The coil 121 is formed by winding a wire so that a cross-sectional shape of the coil 121 becomes a flattened elliptical shape. Further, the coil 121 may be formed by winding the wire around a bobbin formed with a non-magnetic material or a weakly magnetic material. The magnetic core 122 is a plate-like member having a size and a shape which can be inserted into the central hollow portion of the coil 121 and formed with the same or similar magnetic material as the external core portion 114 of the case 110.

The wire for forming the coil 121 is not limited to a specific kind. Examples of the wire include a wire obtained by covering a copper base line with an insulating layer, a wire obtained by covering a copper base line with an insulating layer to which an adhesive (fusion) function is imparted and a combination of two or more of these wires. In this regard, a cross-sectional shape of the wire may be any shape. Examples of the cross-sectional shape of the wire include a polygonal shape such as a triangular shape, a square shape, a rectangular shape and a hexagonal shape; a circular shape and an elliptical shape.

Operating Portion 130

The operating portion 130 is a member which is pivotally operated around the axis 140 by the operator in order to apply the external force to the power generator 100. As shown in FIGS. 4 and 5, the operating portion 130 includes the elongated arm portion 131, a concave portion 132 formed on a distal-side portion (a rear-side portion in FIGS. 4 and 5) of an upper surface of the arm portion 131, a spring fitting axis 133 formed in a proximal-side portion (a front-side portion in FIGS. 4 and 5) of the arm portion 131 so as to pass through the arm portion 131, an axis insertion hole 134 formed in a substantially central portion of the spring fitting axis 133 so as to pass through the spring fitting axis 133 in a thickness direction thereof and a magnet assembly attachment portion 135 provided on a proximal-side portion of a lower surface of the arm portion 131 of the operating portion 130.

The concave portion 132 is configured to receive an end portion 162 of the torsion spring 160. Further, the spring fitting axis 133 is configured so that a portion of the spring fitting axis 133 protruding from the upper surface of the arm portion 131 can be inserted into a central hollow portion of the torsion spring 160. Further, a height of the portion of the spring fitting axis 133 protruding from the upper surface of the arm portion 131 is substantially equal to a height of the central hollow portion of the torsion spring 160. Furthermore, the axis insertion hole 134 is configured so that the axis 140 can be inserted into the axis insertion hole 134.

In the state shown in FIG. 6 in that the power generator 100 has been assembled, the spring fitting axis 133 is inserted into the central hollow portion of the torsion spring 160, the one end portion 161 of the torsion spring 160 is supported in the concave portion 1114 of the first base 1111 provided on the lower plate 111 of the case 110, the other end portion 162 of the torsion spring 160 is supported in the concave portion 132 of the operating portion 130 and the axis 140 is inserted into the axis insertion hole 134 of the operating portion 130. With this configuration, it is possible to support the operating portion 130 so that the operating portion 130 can be pivotally moved with respect to the case 110 around the axis 140.

As shown in FIG. 5, the magnet assembly attachment portion 135 has a V shape constituted of two inclined planes and provided on the proximal-side portion of the lower surface of the arm portion 131 of the operating portion 130. The magnet assembly 150 is attached to a V-shaped outer surface of the magnet assembly attachment portion 135. A method for attaching the magnet assembly 150 to the V-shaped outer surface of the magnet assembly attachment portion 135 is not limited to a specific kind. For example, it is possible to fixedly attach the magnet assembly 150 to the V-shaped outer surface of the magnet assembly attachment portion 135 with a bonding method due to an adhesive agent, a thermal fusion method, a fixing method due to a fixing tool such as a screw and a combination of two or more of these methods.

Each portion of the operating portion 130 described above is formed with the same or similar non-magnetic material or weakly magnetic material as the movable portion containing portion 113 of the case 110. Each portion of the operating portion 130 may be formed with the same non-magnetic material or the same weakly magnetic material or may be formed with different kinds of the non-magnetic material or the weakly magnetic material. Further, although each component of the operating portion 130 may be different components connected with each other with a bonding method or the like, it is preferable to integrally form the operating portion 130 from viewpoints of reducing the number of components and preventing failure connection (bonding) between each component and separation of each component.

Axis 140

The axis 140 is formed with the same or similar non-magnetic material or weakly magnetic material as the movable portion containing portion 113 of the case 110 and serves as a rotational axis of the pivotal movement of the operating portion 130 and a rotational axis of the relative rotational movement of the magnets 151a, 151b with respect to the coil 121. In the state shown in FIG. 6 in that the power generator 100 has been assembled, the axis 140 is inserted into the axis insertion hole 134 of the operating portion 130. Further, the upper end portion of the axis 140 is supported in the third insertion hole 1123 of the upper plate 112 of the case 110 and the lower end portion of the axis 140 is supported in the bearing portion 1113 of the lower plate 111 of the case 110.

Magnet Assembly 150

In the state shown in FIG. 6 in that the power generator 100 has been assembled, the magnet assembly 150 is attached to the V-shaped outer surface of the magnet assembly attachment portion 135 of the operating portion 130. When the operating portion 130 is pivotally moved, the magnet assembly 150 is rotated and moved with respect to the coil 121. As shown in FIGS. 4 and 5, the magnet assembly 150 includes a yoke 152 attached to the magnet assembly attachment portion 135, and the first magnet 151a and the second magnet 151b attached to the yoke 152.

The yoke 152 has a V shape corresponding to the V shape of the magnet assembly attachment portion 135 and is configured so that a V-shaped inner surface of the yoke 152 fits with the V-shaped outer surface of the magnet assembly attachment portion 135. The yoke 152 is formed with the same or similar magnetic material as the external core portion 114 of the case 110 and thus can serve as a part of the magnetic circuit in which the magnetic flux (the lines of magnetic force) passing through the coil 121 flows.

The first magnet 151a and the second magnet 151b are respectively attached to outer surfaces of two inclined planes of the yoke 152 forming the V shape due to their own magnetic force. In this regard, the first magnet 151a and the second magnet 151b may be attached to the yoke 152 due to an adhesive agent or the like in addition to their own magnetic force. With this configuration, it is possible reliably prevent the first magnet 151a and the second magnet 151b from being shifted on the yoke 152 and releasing from the yoke 152.

Each of the first magnet 151a and the second magnet 151b is the same kind of magnet having the same rectangular columnar shape and the same magnetic force. The first magnet 151a is attached to one of the two inclined planes of the yoke 152 forming the V shape so that a north pole plane of the first magnet 151a faces the yoke 152. On the other hand, the second magnet 151b is attached to the other one of the two inclined planes of the yoke 152 forming the V shape so that a south pole plane of the second magnet 151b faces the yoke 152.

As the magnets 151a, 151b, it is possible to use an alnico magnet, a ferrite magnet, a neodymium magnet, a samarium-cobalt magnet, a magnet (a bonded magnet) obtained by molding a composite material prepared by pulverizing and mixing at least one of these magnets with a resin material or a rubber material, or the like. Among them, it is preferable to use the neodymium magnet having strong magnetic force or the samarium-cobalt magnet having high heat resistance as the magnets 151a, 151b.

When the operating portion 130 is pivotally moved and thus the magnet assembly 150 is rotated and moved around the axis 140, the magnets 151a, 151b are relatively rotated and moved with respect to the coil 121 around the axis 140. When the magnets 151a, 151b are relatively moved with respect to the coil 121, the number of the lines of magnetic force (the density of the magnetic flux) passing through the coil 121 varies, thereby generating the electric power in the coil 121.

Thus, in the power generator 100 of the present embodiments, the coil 121 (the coil assembly 120) and the magnets 151a, 151b (the magnet assembly 150) relatively rotated and moved with respect to the coil 121 form a power generating unit for generating the electric power.

Torsion Spring (Elastic Member) 160

In the state shown in FIG. 6 in that the power generator 100 has been assembled, the spring fitting axis 133 is inserted into the central hollow portion of the torsion spring 160, the one end portion 161 of the torsion spring 160 is supported in the concave portion 1114 of the first base 1111 provided on the lower plate 111 of the case 110, the other end portion 162 of the torsion spring 160 is supported in the concave portion 132 of the operating portion 130 and the axis 140 is inserted into the axis insertion hole 134 of the operating portion 130.

When the operating portion 130 is pivotally moved by the applied external force, the torsion spring 160 is elastically deformed to store the applied external force as elastic energy. After that, when the applying of the external force by the operator is released, the torsion spring 160 elastically restores and releases the stored elastic energy to pivotally move the operating portion 130 around the axis 140 rapidly.

Since the magnet assembly 150 is attached to the magnet assembly attachment portion 135 of the operating portion 130 as described above, the magnets 151a, 151b of the magnet assembly 150 are also relatively rotated and moved with respect to the coil 121 around the axis 140 when the operating portion 130 is pivotally moved around the axis 140.

Thus, in this embodiment, the torsion spring 160 serves as the elastic member for storing the external force applied through the operating portion 130 as the elastic energy and releasing the stored elastic energy to relatively rotate and move the magnets 151a, 151b with respect to the coil 121.

Motion of the Power Generator 100

Next, description will be given to the motion of the power generator 100 with reference to FIGS. 7A-F. In this regard, the upper plate 112 of the power generator 100 is omitted for showing the internal structure of the power generator 100 in FIGS. 7A-F.

Initial State

Figure 7A:
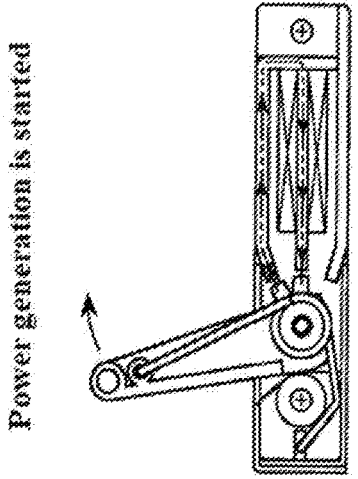
FIGS. 7A-F are views for explaining motion of the power generator shown in FIG. 3.
Figure 8A:
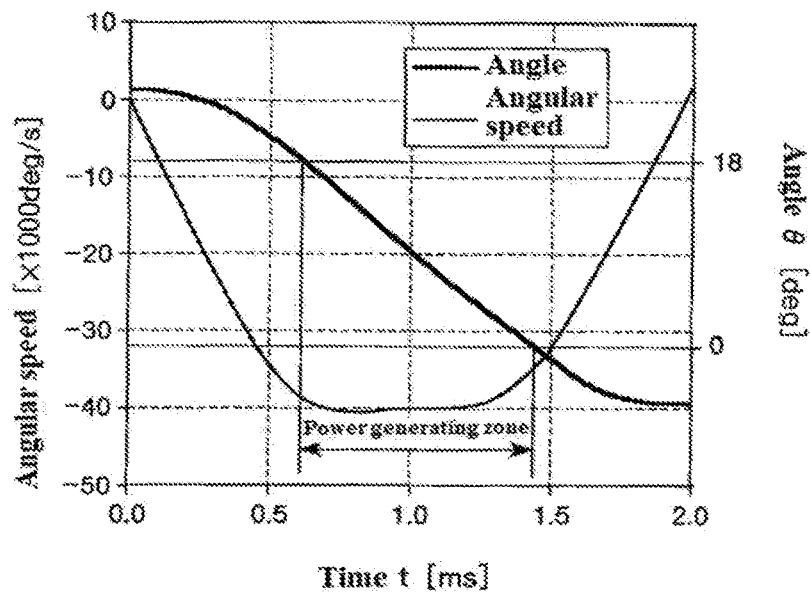
FIGS. 8A-C are a graph and views showing a variation of a rotational speed of the magnet during the motion of the power generator shown in FIGS. 7A-F.
Figure 8B:
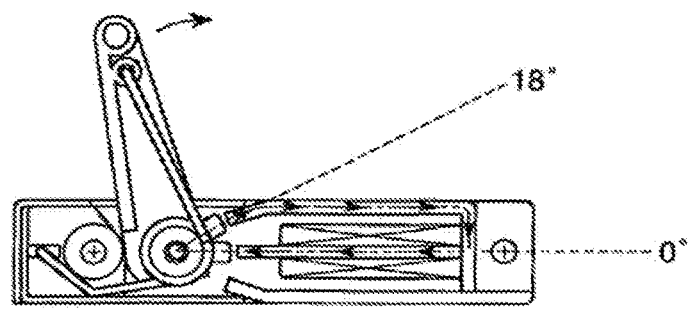
Figure 8C:
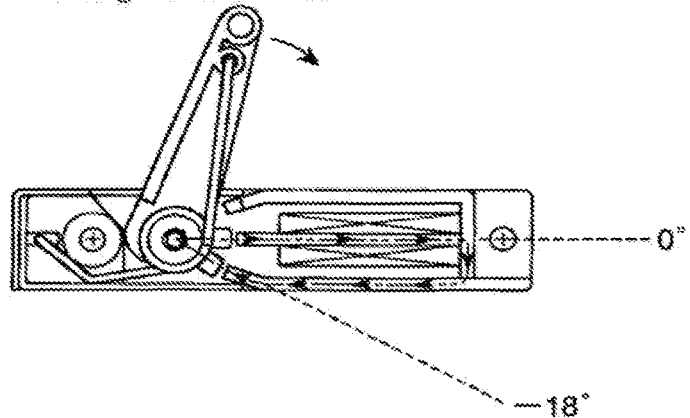

FIG. 7A shows a top view of the power generator 100 in an initial state that the power generator 100 has been assembled and the external force is not applied to the operating portion 130. As shown in FIG. 7A, in the initial state that the external force is not applied to the operating portion 130, the first magnet 151a and the second magnet 151b are positioned so as to be separated from the external core portion 114 of the case 110 and the magnetic core 122 of the coil assembly 120 by a predetermined distance.

In the initial state, the first magnet 151a is positioned between the first bent portion 1144 of the first plate-like portion 1141 of the external core portion 114 and the magnetic core 122 of the coil assembly 120 and the second magnet 151b is positioned between the second bent portion 1145 of the second plate-like portion 1142 of the external core portion 114 and the magnetic core 122 of the coil assembly 120.

The External Force is Applied

Figure 7D:
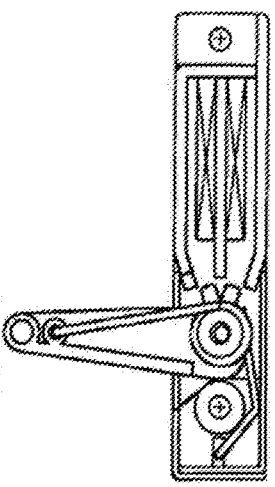
Figure 7B:
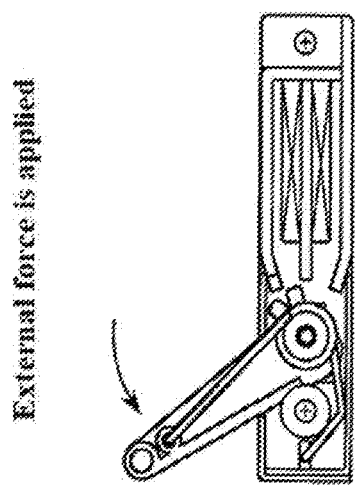

FIG. 7B shows the top view of the power generator 100 in a state that the external force is applied to the operating portion 130 by the operator and the operating portion 130 is pivotally moved in the counter-clockwise direction around the axis 140. When the operator presses the operating portion 130 in a direction indicated by an arrow line in FIG. 7B to apply the external force, the operating portion 130 is pivotally moved in the counter-clockwise direction around the axis 140. The operating portion 130 is pivotally moved in the counter-clockwise direction until the arm portion 131 of the operating portion 130 makes contact with the cutout portion 1133 formed in the second L-shaped portion 1132 of the movable portion containing portion 113 and thus the power generator 100 shifts to a state shown in FIG. 7B. As a result, the torsion spring 160 (the elastic member) is elastically deformed and thereby the applied external force is stored in the torsion spring 160 as the elastic energy.

The pivotal movement of the operating portion 130 in the counter-clockwise direction due to the applied external force is restricted by the cutout portion 1133. Since the operator always continues to apply the external force until the arm portion 131 of the operating portion 130 makes contact with the cutout portion 1133, it is possible to make the elastic energy stored in the torsion spring 160 constant. With this configuration, it is possible to prevent the elastic energy stored in the torsion spring 160 from varying every time when the operation by the operating portion 130 is performed. Thus, it is possible to stabilize a speed of the relative rotational movement of the magnets 151a, 151b with respect to the coil 121.

In this regard, when the operating portion 130 is pivotally moved in the counter-clockwise direction by the applied external force, the magnets 151a, 151b are relatively rotated and moved with respect to the coil 121 and thus the number of the lines of magnetic force (the density of the magnetic flux) passing through the coil 121 varies. However, since the speed of the rotational movement of the magnets 151a, 151b due to the external force applied by the operator is slower than a time scale of an electromagnetic phenomenon and is not stable, an amount of the electric power generated in the coil 121 by this rotational movement is significantly small. Thus, the electric power generated in the coil 121 when the magnets 151a, 151b are relatively rotated and moved with respect to the coil 121 by the external force applied by the operator does not substantially contribute to the amount of the electric power generated by the power generator 100.

As shown in FIG. 7B, at the time when the pivotal movement of the operating portion 130 in the counter-clockwise direction due to the applied external force finishes, the first magnet 151a is positioned between the second bent portion 1145 of the second plate-like portion 1142 of the external core portion 114 and the magnetic core 122 of the coil assembly 120 and the second magnet 151b is positioned on the outside of the second bent portion 1145 of the second plate-like portion 1142 of the external core portion 114.

The Applying of the External Force is Released and Power Generation is Started

Figure 7E:
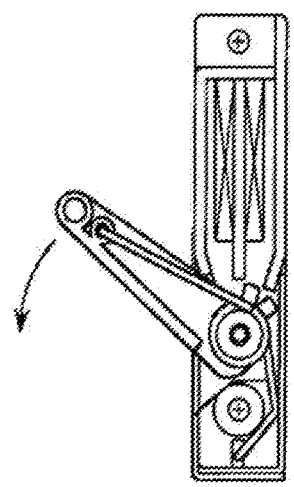
Figure 7C:
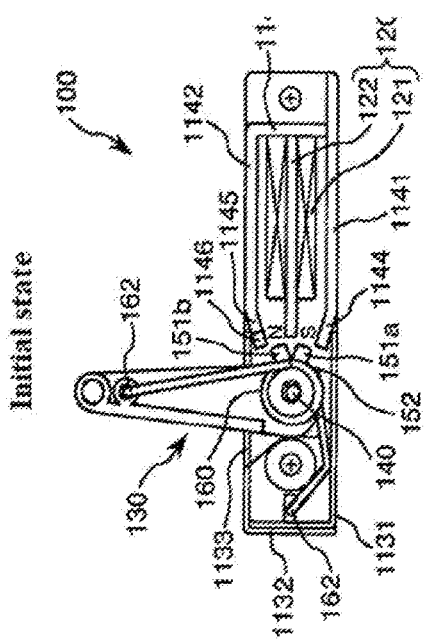

FIG. 7C shows the top view of the power generator 100 when the applying of the external force to the operating portion 130 is released and the power generation of the power generator 100 is started.

After the operator applies the external force to the operating portion 130 until the arm portion 131 of the operating portion 130 makes contact with the cutout portion 1133, the operator releases the applying of the external force to the operating portion 130. When the applying of the external fore to the operating portion 130 is released, the elastic energy stored in the torsion spring 160 is released. As a result, the operating portion 130 is pivotally moved in the clockwise direction around the axis 140 rapidly and thus the power generator 100 shifts to a state shown in FIG. 7C.

When the operating portion 130 is pivotally moved in the clockwise direction around the axis 140 rapidly, the magnets 151a, 151b of the magnet assembly 150 attached to the operating portion 130 are also rapidly rotated and moved (relatively moved) with respect to the coil 121 around the axis 140 in the clockwise direction. As shown in FIG. 7C, due to the rotational movement of the magnets 151a, 151b, the first magnet 151a takes a closest position with respect to the magnetic core 122 (the coil 121) of the coil assembly 120 and the second magnet 151b takes a closest position with respect the second bent portion 1145 of the second plate-like portion 1142 of the external core portion 114 at the same time. At this time, the power generation of the power generator 100 is substantially started.

The magnets 151a, 151b are sufficiently accelerated after the applying of the external force is released in the state shown in FIG. 7B and before the power generation of the power generator 100 is started in the state shown in FIG. 7C. Namely, it is possible to consider a moving zone of the magnets 151a, 151b while the power generator 100 of this embodiment shifts from the state shown in FIG. 7B to the state shown in FIG. 7C as an accelerating zone for the magnets 151a, 151b.

Further, since a distance between the first magnet 151a and the magnetic core 122 of the coil assembly 120 and a distance between the second magnet 151b and the second bent portion 1145 are large in this accelerating zone, rotary torque (rotary resistance) caused by the magnets 151a, 151b and the magnetic members (the coil assembly 120 and the external core portion 114) is small. Thus, it is possible to efficiently accelerate the magnets 151a, 151b in this accelerating zone.

By forming the accelerating zone for the magnets 151a, 151b described above in the power generator 100, the magnets 151a, 151b are sufficiently accelerated. Thus, it is possible to allow the first magnet 151a to take the closest position with respect to the magnetic core 122 (the coil 121) of the coil assembly 120 and allow the second magnet 151b to take the closest position with respect to the second bent portion 1145 at the same time in a state that the speed of the rotational movement of the magnets 151a, 151b becomes substantially maximum. With this configuration, it is possible to sufficiently increase the variation of the lines of magnetic force (the density of the magnetic flux) passing through the coil 121 due to the rotational movement (the relative movement) of the magnets 151a, 151b with respect to the coil 121 at the time of the power generation of the power generator 100.

In this regard, the language of "the speed of the rotational movement of the magnets 151a, 151b becomes substantially maximum" used herein means that the speed of the rotational movement of the magnets 151a, 151b becomes equal to or more than 80% of the maximum speed of the rotational movement of the magnets 151a, 151b as described later with reference to FIGS. 8A-C, and more specifically means that the speed of the rotational movement of the magnets 151a, 151b becomes equal to or more than 85% of the maximum speed of the rotational movement of the magnets 151a, 151b.

In this regard, even while the magnets 151a, 151b are accelerated in the accelerating zone, the magnets 151a, 151b are relatively rotated and moved with respect to the coil 121 and thus the number of the lines of magnetic force (the density of the magnetic flux) passing through the coil 121 varies. However, since the speed of the rotational movement of the magnets 151*a*, 151*b* in the accelerating zone is slower than the time scale of the electromagnetic phenomenon and the distance between the first magnet 151*a* and the magnetic core 122 of the coil assembly 120 and the distance between the second magnet 151*b* and the second bent portion 1145 are large, the electric power generated in the coil 121 by the rotational movement in this accelerating zone is significantly small. Thus, the electric power generated in the coil 121 in the accelerating zone does not substantially contribute to the amount of the generated electric power of the power generator 100.

In the state shown in FIG. 7C, the magnetic circuit is formed by the second magnet 151*b*, the external core portion 114 (the second plate-like portion 1142 and the connecting portion 1143), the magnetic core 122, the first magnet 151*a* and the yoke 152. In the state shown in FIG. 7C, the lines of magnetic force flowing in the magnetic circuit in the clockwise direction pass through the coil 121 from the right side to the left side.

Further, when the first magnet 151*a* takes the closest position with respect to the magnetic core 122 (the coil 121) of the coil assembly 120, a right-side end surface (a south pole plane) of the first magnet 151*a* approximately horizontally faces a left-side end surface of the magnetic core 122 of the coil assembly 120. On the other hand, when the second magnet 151*b* takes the closest position with respect to the second bent portion 1145, a right-side end surface (a north pole plane) of the second magnet 151*b* faces a left-side end surface of the second bent portion 1145. With this configuration, diffusion of the lines of magnetic force between the first magnet 151*a* and the magnetic core 122 of the coil assembly 120 and between the second magnet 151*b* and the second bent portion 1145 is prevented. Thus, it is possible to improve efficiency of the power generation of the power generator 100.

The Power Generation Finishes

FIG. 7D shows the top view of the power generator 100 at the time when the power generation of the power generator 100 finishes.

When the operating portion 130 is further pivotally moved in the clockwise direction in the state shown in FIG. 7C, the power generator 100 shifts to a state shown in FIG. 7D. When the power generator 100 shifts to the state shown in the FIG. 7D, the power generation of the power generator 100 substantially finishes.

In the state shown in FIG. 7D, the first magnet 151*a* takes a closest position with respect to the first bent portion 1144 of the first plate-like portion 1141 of the external core portion 114 and the second magnet 151*b* takes a closest position with respect to the magnetic core 122 (the coil 121) of the coil assembly 120.

In this regard, while the power generator 100 shifts from the state shown in FIG. 7C to the state shown in FIG. 7D, that is in a power generating zone of the power generator 100, the speed of the rotational movement (the relative movement) of the magnets 151*a*, 151*b* with respect to the coil 121 is kept substantially maximum. Thus, it is possible to sufficiently increase the variation of the number of magnetic force (the density of the magnetic flux) passing through the coil 121 in the power generating zone of the power generator 100.

Further, in the state shown in FIG. 7D, the magnetic circuit is formed by the second magnet 151*b*, the magnetic core 122, the external core portion 114 (the connecting portion 1143 and the first plate-like portion 1141), the first magnet 151*a* and the yoke 152. In the state shown in FIG. 7D, the lines of magnetic force flowing in the magnetic circuit in the clockwise direction pass through the coil 121 from the left side to the right side. Since the lines of magnetic force pass through the coil 121 from the right side to the left side in the state shown in FIG. 7C, a direction of the lines of magnetic force passing through the coil 121 is inverted in the power generating zone in which the power generator 100 shifts from the state shown in FIG. 7C to the state shown in FIG. 7D. Thus, it is possible to sufficiently increase the variation of the lines of the magnetic force (the density of the magnetic flux) passing through the coil 121 in the power generating zone of the power generator 100.

Further, when the first magnet 151*a* takes the closest position with respect to the first bent portion 1144, the right-side end surface (the south pole plane) of the first magnet 151*a* faces a left-side end surface of the first bent portion 1144. On the other hand, when the second magnet 151*b* takes the closest position with respect to the magnetic core 122 (the coil 121) of the coil assembly 120, the right-side end surface (the north pole plane) of the second magnet 151*b* approximately horizontally faces the left-side end surface of the magnetic core 122. With this configuration, diffusion of the lines of magnetic force between the first magnet 151*a* and the first bent portion 1144 and between the second magnet 151*b* and the magnetic core 122 of the coil assembly 120 is prevented. Thus, it is possible to improve the efficiency of the power generation of the power generator 100.

In this regard, even after the state shown in FIG. 7D, the magnets 151*a*, 151*b* are relatively rotated and moved with respect to the coil 121 and thus the number of the lines of magnetic force (the density of the magnetic flux) passing through the coil 121 varies. However, the speed of the rotational movement of the magnets 151*a*, 151*b* decreases after the state shown in FIG. 7D. In addition, a distance between the first magnet 151*a* and the first bent portion 1144 and a distance between the second magnet 151*b* and the magnetic core 122 of the coil assembly 120 increase. Thus, the electric power generated in the coil 121 after the state shown in FIG. 7D does not substantially contribute the amount of the generated electric power of the power generator 100. Thus, the power generation of the power generator 100 substantially finishes in the state shown in FIG. 7D.

The Rotational Movement is Stopped and the Power Generator 100 Shifts to the Initial State FIG. 7E shows the top view of the power generator 100 at the time when the rotational movement of the magnets 151*a*, 151*b* with respect to the coil 121 is stopped.

When the operating portion 130 is further pivotally moved in the clockwise direction after the state shown in FIG. 7D, the operating portion 130 makes contact with the cutout portion 1146 of the second plate-like portion 1142 of the external core portion 114 and thus the pivotal movement of the operating portion 130 is stopped. At this time, the rotational movement of the magnets 151*a*, 151*b* with respect to the coil 121 is stopped and thus the power generator 100 shifts to a state shown in FIG. 7E.

Figure 7F:
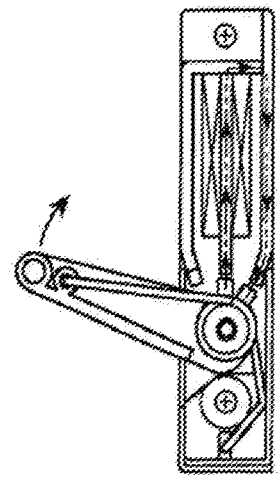

When the rotational movement of the magnets 151*a*, 151*b* with respect to the coil 121 is stopped in the state shown in FIG. 7E, the operating portion 130 is pivotally moved in the counter-clockwise direction by the torsion spring 160. As a result, the power generator 100 returns to the initial state as shown in FIG. 7F.

As described above, the accelerating zone is started is formed in the power generator 100 of the present embodiments for sufficiently accelerating the magnets 151a, 151b before the substantial power generation. Thus, it is possible to start the power generation in a state that the magnets 151a, 151b are sufficiently accelerated.

Further, in the power generating zone (from the state shown in FIG. 7C to the state shown in FIG. 7D) of the power generator 100 of the present invention, the external core portion 114 (the first plate-like portion 1141, the second plate-like portion 1142 and the connecting portion 1143) which is a part of the case 110 serves a part of the magnetic circuit formed at the time of generating the electric power. Thus, it is possible to reduce the number of components required for forming the magnetic circuit, thereby simplifying and downsizing the configuration of the power generator 100. With this configuration, it is possible to improve productivity of the power generator 100.

Further, in the power generator 100 of the present invention, the speed of the relative rotational movement of the magnets 151a, 151b with respect to the coil 121 becomes substantially maximum in the power generating zone. FIGS. 8A-C are a graph and views showing a variation of the speed of the relative rotational movement of the magnet 151b during the motion of the power generator 100 described in detail with reference to FIGS. 7A-F. FIG. 8A is a graph for explaining the variation of the rotational speed of the magnet 151b during the motion of the power generator 100 shown in FIGS. 7A-F. FIG. 8B is a view showing a state that the power generation of the power generator 100 is started. FIG. 8C is a view showing a state that the power generation of the power generator 100 finishes.

Further, in the power generator 100 of the present embodiments, the elastic energy released from the torsion spring 160 for the pivotal movement of the operating portion 130, that is the relative rotational movement of the magnets 151a, 151b with respect to the coil 121 does not depend on the operating speed of the operating portion 130 by the operator and only depends on an amount of the pivotal movement of the operating portion 130 (an amount of elastic deformation of the torsion spring 160) caused by the applied external force. Thus, it is possible to rotate and move the magnets 151a, 151b with respect to the coil 121 with always constant force regardless of the operating speed of the operating portion 130 by the operator. Therefore, it is possible to stabilize the speed of the rotational movement of the magnets 151a, 151b with respect to the coil 121, thereby stabilizing the amount of the electric power generated by the power generator 100 of the present embodiments.

Further, in the power generator 100 of the present embodiments, a spring constant of the torsion spring 160 is adjusted so that the elastic energy stored in the torsion spring 160 and released from the torsion spring 160 has a sufficient amount for generating the electric power with an amount required for driving the electronic circuit. Thus, the power generator 100 of the present embodiments can provide the electric power with the sufficient amount for driving the electronic circuit of the electronic device with one time of the relative movement (the rotational movement) of the magnets 151a, 151b with respect to the coil 121 without reciprocating the magnets 151a, 151b with respect to the coil 121.

As described above, since the power generator 100 of the present embodiments can provide the electric power with the sufficient amount for driving the electronic circuit with one time of the relative movement (the rotational movement) of the magnets 151a, 151b with respect to the coil 121, it is unnecessary to rectify the current obtained by the power generator 100 of the present embodiments and boost the voltage generated by the power generator 100 of the present embodiments. Thus, it is possible to prevent the amount of the obtained electric power from being unstable due to energy loss at the time of the rectification and the boosting.

Further, in the power generator 100 of the present embodiments, the speed of the relative rotational movement of the magnets 151a, 151b with respect to the coil 121 becomes substantially maximum in the power generating zone. FIG. 8 is a graph showing the speed of the relative rotational movement of the magnet 151b during the motion of the power generator 100 described in detail with reference to FIG. 7.

As shown in FIGS. 8A-C, each of the magnets 151a, 151b is rotated by about 18 degrees in the power generating zone and a total amount of the rotational movement of the two magnets 151a, 151b is about 36 degrees. In this regard, the amount of the rotational movement (the speed of the rotation) of the magnets 151a, 151b shown in FIGS. 8A-C is merely one example and it is possible to appropriately set the amount of the rotational movement (the speed of the rotation) of the magnets 151a, 151b depending on some conditions such as the strength of the magnetic force of the magnets 151a, 151b and the required amount of the generated electric power.

The speed of the rotational movement of the magnets 151a, 151b in the power generating zone is equal to or more than about 80% of the maximum speed of the rotational movement of the magnets 151a, 151b and more specifically equal to or more than 85% of the maximum speed of the rotational movement of the magnets 151a, 151b. Thus, it is possible to sufficiently increase the variation of the number of the lines of magnetic force (the density of the magnetic flux) passing through the coil 121 in the power generating zone of the power generator 100, thereby improving the efficiency of the power generation of the power generator 100.

Second Embodiment

Figure 9:
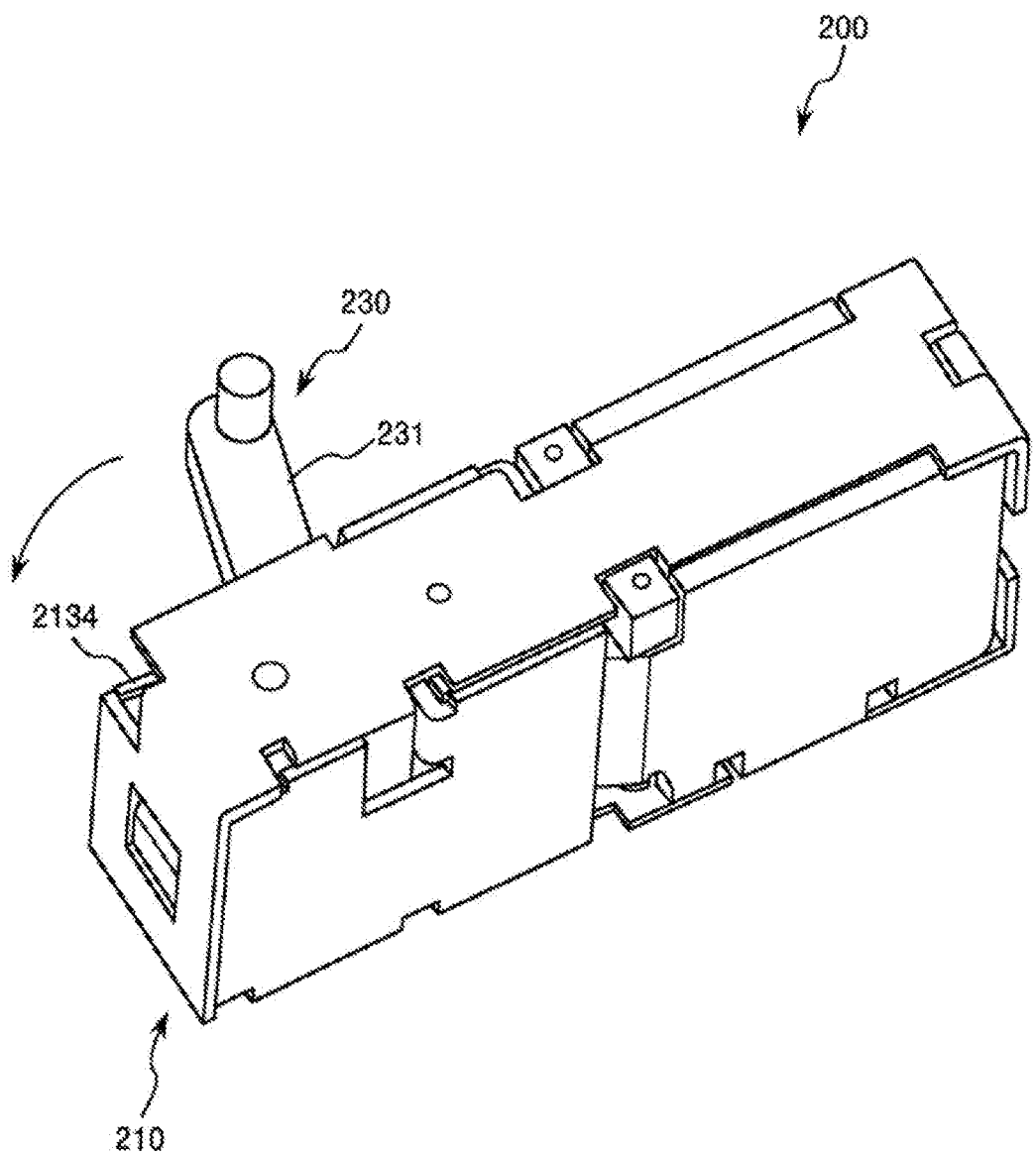
FIG. 9 is a perspective view showing an external view of a power generator according to a second embodiment of the present embodiments.
Figure 10:
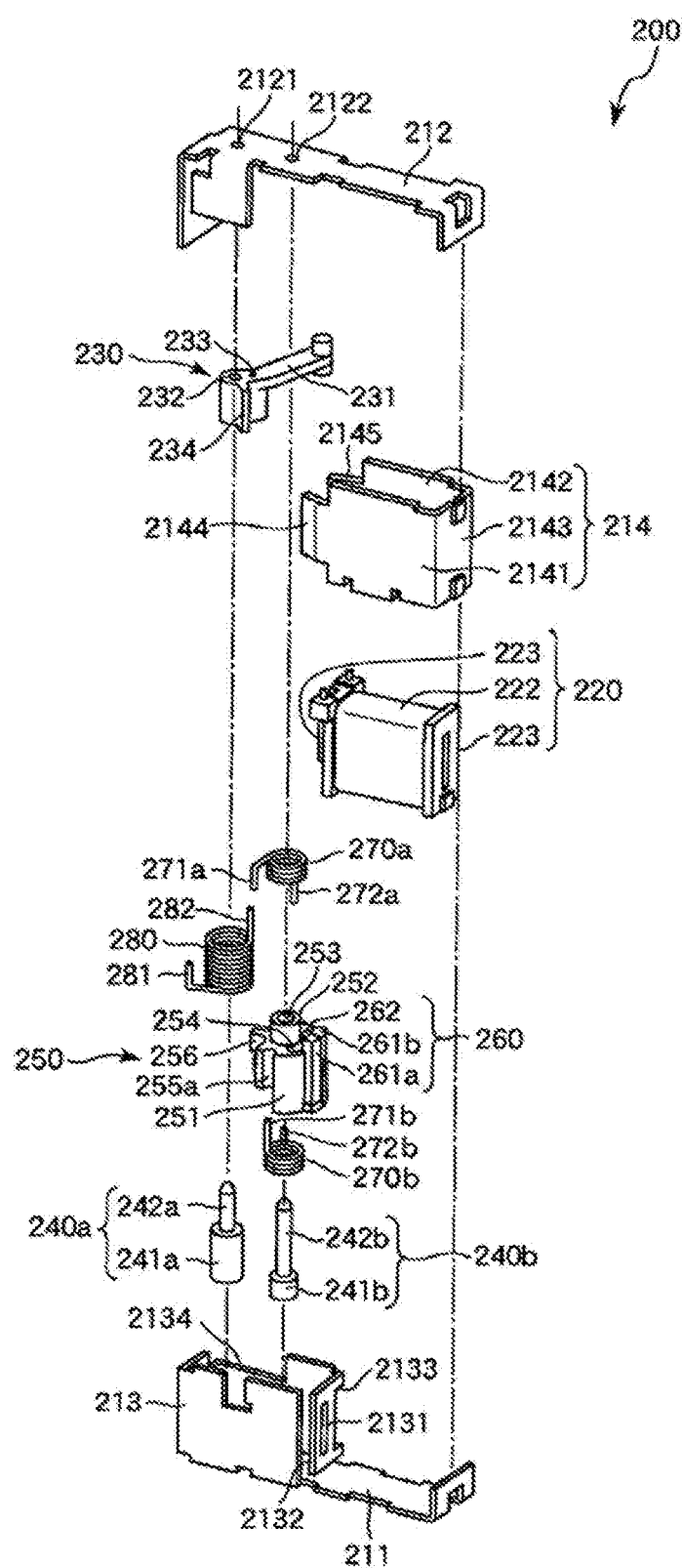
FIG. 10 is an exploded perspective view of the power generator shown in FIG. 9.
Figure 11:
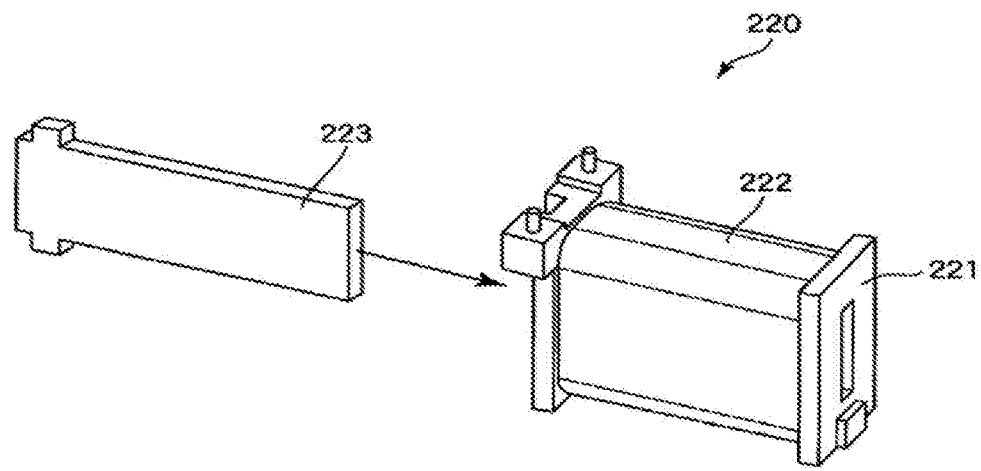
FIG. 11 is a view showing a coil assembly of the power generator shown in FIG. 9.
Figure 12:
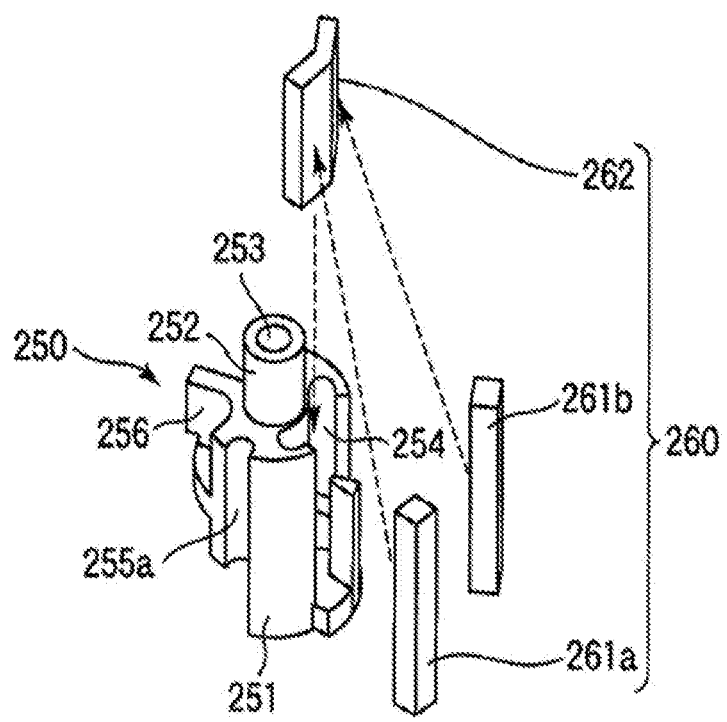
FIG. 12 is view showing a rotating member and a magnet assembly of the power generator shown in FIG. 9.
Figure 13:
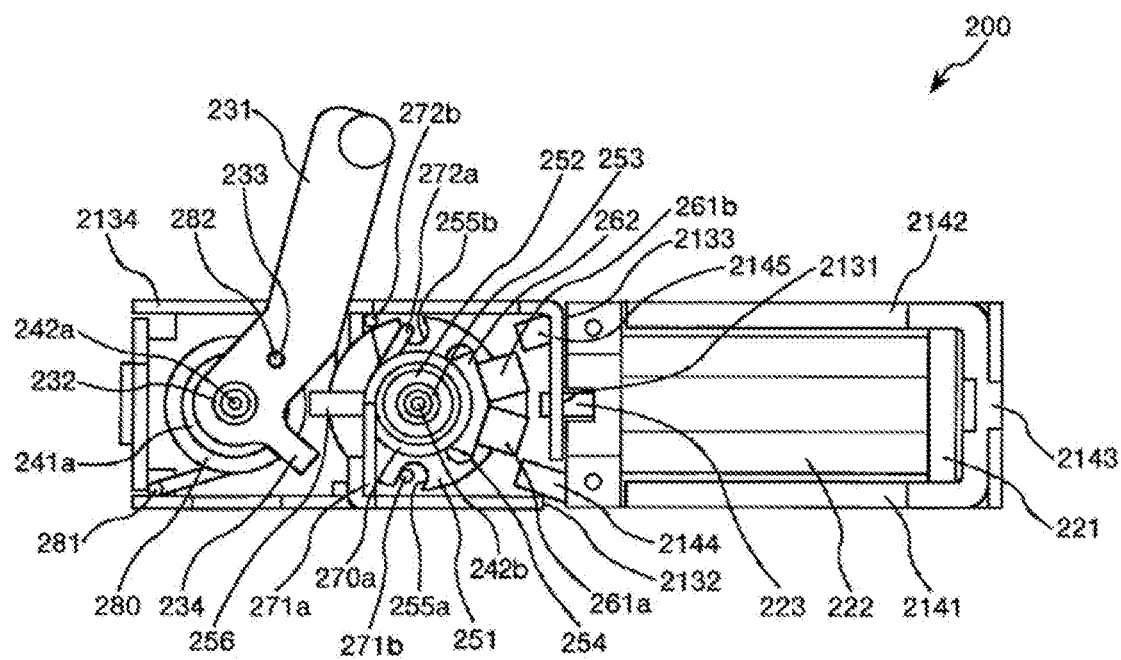
FIG. 13 is a top view showing an internal structure of the power generator shown in FIG. 9.

Next, a power generator according to a second embodiment of the present invention will be described in detail with reference to FIGS. 9 to 15. FIG. 9 is a perspective view showing an external view of the power generator according to the second embodiment of the present invention. FIG. 10 is an exploded perspective view of the power generator shown in FIG. 9. FIG. 11 is a view showing a coil assembly of the power generator shown in FIG. 9. FIG. 12 is view showing a rotating member and a magnet assembly of the power generator shown in FIG. 9. FIG. 13 is a top view showing an internal structure of the power generator shown in FIG. 9. FIGS. 14A-F are views for explaining motion of the power generator shown in FIG. 9. FIGS. 15A-E are other views for explaining the motion of the power generator shown in FIG. 9. In this regard, in FIG. 13, an upper plate of the power generator is omitted for showing the internal structure of the power generator.

Hereinafter, an upper side in each of FIGS. 9, 10, 11 and 12 is referred to as "upper" or "upper side", a lower side in each of FIGS. 9, 10, 11 and 12 is referred to as "lower" or "lower side", a left side in each of FIGS. 9, 10, 11 and 12 is referred to as "left" or "left side" and a right side in each of FIGS. 9, 10, 11 and 12 is referred to as "right" or "right side". Further, a rear side of the paper in each of FIGS. 9, 10, 11 and 12 is referred to as "rear side" and a front side of the paper in each of FIGS. 9, 10, 11 and 12 is referred to as "front side".

Hereinafter, the power generator according to the second embodiment will be described by placing emphasis on the points differing from the power generator according to the first embodiment, with the same matters being omitted from the description. The power generator of the second embodiment is based on the same concept as the power generator 100 of the first embodiment. The power generator of the second embodiment is configured to perform two times of power generations by utilizing one time of external force applying operation of an operator in addition to the concept described with reference to the power generator 100 of the first embodiment.

In substance, a power generator 200 of the second embodiment shown in FIGS. 9 and 10 includes a case 210 for containing each component of the power generator 200, a coil assembly 220 including a coil 222 fixedly provided in the case 210, an operating portion 230 which is provided so that the operating portion 230 can be pivotally moved with respect to the case 210 and pivotally operated around a first axis 242a to apply external force, a rotating member 250 provided so as to be rotated by the operating portion 230, a magnet assembly 260 including a first magnet 261a and a second magnet 261b provided on the rotating member 250 so as to be relatively rotated and moved with respect to the coil 222, and a upper torsion spring 270a and a lower torsion spring 270b for storing the external force applied through the operating portion 230 as elastic energy and releasing the stored elastic energy to relatively rotate and move the magnets 261a, 261b with respect to the coil 222.

As shown in FIG. 9, in a state that the power generator 200 has been assembled, an arm portion 231 of the operating portion 230 protrudes from the case 210 toward the rear side. An operator applies the external force to pivotally move the operating portion 230 in a direction indicated by an arrow line in FIG. 9. When the external force is applied to the power generator 200, the power generator 200 performs two times of power generation with utilizing the applied external force.

Hereinafter, each component of the power generator 200 will be described in detail.

Case 210

The case 210 is an elongated box-like member (with a size of about 8 mm width×about 12 mm height×about 33 mm length, for example) for containing each component of the power generator 200. The case 210 includes a lower plate 211, an upper plate 212, a movable portion containing portion 213 for containing movable portions of the power generator 200 and an external core portion 214 which contains the coil assembly 220 and serves as an external core for the coil 222.

The lower plate 211 is an elongated plate-like member serving as a base plate for the entire of the power generator 200. The movable portion containing portion 213 is integrally formed on a left-side portion of an upper surface of the lower plate 211. The movable portion containing portion 213 is constituted of four plate-like portions surrounding a space for containing the movable portions of the power generator 200. Further, slits 2131, 2132, 2133 through which a magnetic core 223 of the coil assembly 220, a first plate-like portion 2141 and a second plate-like portion 2142 of the external core portion 214 are respectively inserted are formed in a right-side surface of the movable portion containing portion 213. Furthermore, a right-side end portion of the lower plate 211 is configured to engage with the external core portion 214.

Further, a cutout portion 2134 is formed in a portion of the movable portion containing portion 213 on the left and rear side. As shown in FIG. 9, in the state that the power generator 200 has been assembled, the arm portion 231 of the operating portion 230 protrudes toward an outside of the case 210 through the cutout portion 2134.

A first axis member 240a and a second axis member 240b are fixedly provided on the upper surface of the lower plate 211 and in the movable portion containing portion 213. The first axis member 240a includes a first support portion 241a for supporting a lower surface of the operating portion 230 and a first axis 242a formed on the first support portion 241a.

The first support portion 241a is a columnar member and inserted into a central hollow portion of a torsion spring 280 for biasing the operating portion 230 in a state shown in FIG. 13 in that the power generator 200 has been assembled.

The first axis 242a is a columnar member formed on a substantially central portion of an upper surface of the first support portion 241a and inserted into an axis insertion hole 232 of the operating portion 230 in the state shown in FIG. 13 in that the power generator 200 has been assembled. In this regard, a diameter of the first support portion 241a is larger than a diameter of the axis insertion hole 232 and thus the operating portion 230 is supported on the first support portion 241a in the state shown in FIG. 13 in that the power generator 200 has been assembled.

The second axis member 240b includes a second support portion 241b for supporting a lower surface of the rotating member 250 and a second axis 242b formed on the second support portion 241b. The second support portion 241b is a columnar member and inserted into a central hollow portion of the lower torsion spring 270b in the state shown in FIG. 13 in that the power generator 200 has been assembled.

The second axis 242b is a columnar member formed on a substantially central portion of an upper surface of the second support portion 241b and inserted into an axis insertion hole 253 of the rotating member 250 in the state shown in FIG. 13 in that the power generator 200 has been assembled. In this regard, a diameter of the second support portion 241b is larger than a diameter of the axis insertion hole 253 and thus the rotating member 250 is supported on the second support portion 241b in the state shown in FIG. 13 in that the power generator 200 has been assembled.

The upper plate 212 is an elongated plate-like portion serving as a cover for the entire of the power generator 200. The upper plate 212 includes a first insertion hole 2121 for supporting an end portion of the first axis 242a and a second insertion hole 2122 for supporting an end portion of the second axis 242b.

The first insertion hole 2121 is formed at a position corresponding to the first axis 242a on the lower plate 211. The second insertion hole 2122 is formed at a position corresponding to the second axis 242b on the lower plate 211. A right-side end portion of the upper plate 212 is configured to engage with the external core portion 214 and a left-side end portion of the upper plate 212 is configured to engage with the movable portion containing portion 213 on the lower plate 211. By engaging the lower plate 211, the upper plate 212, the movable portion containing portion 213 and the external core portion 214 with each other in a state that each component of the power generator 200 are contained in the case 210, it is possible to assemble the power generator 200.

As a constituent material for the lower plate 211, the upper plate 212 and the movable portion containing portion 213 described above, it is possible to use the same non-magnetic material and weakly magnetic material as the lower plate 111, the upper plate 112 and the movable portion containing portion 113 of the case 110 of the described first embodiment. The lower plate 211, the upper plate 212 and the movable portion containing portion 213 may be formed with the same non-magnetic material or weakly magnetic material or may be formed with different kinds of the non-magnetic material or weakly magnetic material.

The external core portion 214 includes the first plate-like portion 2141, the second plate-like portion 2142 facing the first plate-like portion 2141 and a connecting portion 2143 for connecting the first plate-like portion 2141 and the second plate-like portion 2142. In the state shown in FIG. 13 in that the power generator 200 has been assembled, the coil assembly 220 (the coil 222) is contained between the first plate-like portion 2141 and the second plate-like portion 2142.

The external core portion 214 can be formed with the same or similar magnetic material as the external core portion 114 of the described first embodiment. Further, the first plate-like portion 2141, the second plate-like portion 2142 and the connecting portion 2143 may be formed with the same magnetic material or may be formed with different kinds of the magnetic material.

Since the external core portion 214 is formed with the magnetic material, the external core portion 214 can serve as a part of a magnetic circuit in which magnetic flux (lines of magnetic force) generated from the magnets 261a, 261b and passing through the coil 222 flows.

The first plate-like portion 2141 is an elongated plate-like member. A first bent portion 2144 is formed at a left-side end of the first plate-like portion 2141. The first bent portion 2144 is formed by bending the left-side end of the first plate-like portion 2141 toward the inner side (the rear side in FIG. 10). Further, the first bent portion 2144 is configured so that a left-side end portion of the first bent portion 2144 faces an end portion of the first magnet 261a or an end portion of the second magnet 261b during motion of the power generator 200 described with reference to FIGS. 14 and 15.

The second plate-like portion 2142 is an elongated plate-like portion which is the substantially same as the first plate-like portion 2141. A second bent portion 2145 is formed at a left-side end of the second plate-like portion 2142. The second bent portion 2145 is formed by bending the left-side end of the second plate-like portion 2142 toward the inner side (the front side in FIG. 10). Further, the second bent portion 2145 is configured so that a left-side end portion of the second bent portion 2145 faces the end portion of the first magnet 261a or the end portion of the second magnet 261b during the motion of the power generator 200 described with reference to FIGS. 14 and 15.

Further, in the state shown in FIG. 13 in that the power generator 200 has been assembled, the first bent portion 2144 of the first plate-like portion 2141 is inserted through the slit 2132 of the movable portion containing portion 213 of the case 210 and thus a left-side end portion of the first bent portion 2144 is positioned in the movable portion containing portion 213. As is the case with the first bent portion 2144, the second bent portion 2145 of the second plate-like portion 2142 is inserted through the slit 2133 of the movable portion containing portion 213 of the case 210 and thus a left-side end portion of the second bent portion 2145 is positioned in the movable portion containing portion 213.

In this regard, although the first plate-like portion 2141, the second plate-like portion 2142 and the connecting portion 2143 are formed integrally with each other in this embodiment, the present embodiments is not limited thereto. For example, all of the first plate-like portion 2141, the second plate-like portion 2142 and the connecting portion 2143 may be formed as different components or the connecting portion 2143 may be formed integrally with one of the first plate-like portion 2141 and the second plate-like portion 2142.

Coil Assembly 220

As shown in FIG. 11, the coil assembly 220 includes a bobbin 221, the coil 222 formed by winding a wire on an outer periphery of the bobbin 221 and the magnetic core 223 inserted into a central hollow portion of the bobbin 221 (the coil 222).

The bobbin 221 is formed with the same or similar non-magnetic material or weakly magnetic material as the lower plate 211, the upper plate 212 and the movable portion containing portion 213 of the case 210 and serves as a base for fixedly holding the coil 222 in the case 210 in addition to the function of a bobbin for the coil 222. Since the coil 222 and the magnetic core 223 have the same configuration as these of the coil 121 and the magnetic core 122 of the described first embodiment, description for the coil 222 and the magnetic core 223 is omitted in the following description.

When the magnets 261a, 261b are relatively moved with respect to the coil 222, the number of the lines of magnetic force (density of the magnetic flux) passing through the coil 222 varies, thereby generating electric power in the coil 222. Both end portions of the coil 222 (power lead wires) are connected to an electronic circuit (not shown in the drawings) provided outside the power generator 200 and the electric power generated in the coil 222 is supplied to the electronic circuit through the power lead wires, and thereby the electronic circuit is driven by the supplied electronic power.

The coil assembly 220 is fixedly arranged on the lower plate 211 of the case 210. Further, in the state shown in FIG. 13 in that the power generator 200 has been assembled, the coil assembly 220 is positioned between the first plate-like portion 2141 and the second plate-like portion 2142 of the external core portion 214 of the case 210. Further, the magnetic core 223 is inserted through the slit 2131 of the movable portion containing portion 213 of the case 210 and thus a left-side end portion of the magnetic core 223 is positioned in the movable portion containing portion 213.

A method for fixedly arranging the coil assembly 220 on the lower plate 211 of the case 210 is not particularly limited to a specific method. It is possible to fixedly arrange the coil assembly 220 on the lower plate 211 of the case 210 with an engagement between the lower plate 211 and the external core portion 214, a bonding method due to an adhesive agent, a thermal fusion method, a fixing method due to a fixing tool such as a screw and a combination of two or more of these methods.

Operating Portion 230

The operating portion 230 is a member which is pivotally operated around the first axis 242a by the operator in order to apply the external force to the power generator 200. As shown in FIG. 10, the operating portion 230 includes the elongated arm portion 231, the axis insertion hole 232 through which the first axis 242a is inserted, a through-hole 233 for receiving an end portion 282 of the torsion spring 280 and an engaging portion 234 engaged with the rotating member 250.

The axis insertion hole 232 is formed in a proximal-side portion (a front-side portion in FIG. 10) of the arm portion 231 so as to pass through the arm portion 231 in a thickness direction thereof and configured so that the first axis 242a of the first axis member 240*a* can be inserted into the axis insertion hole 232. The through-hole 233 is formed in the proximal-side portion of the arm portion 231 so as to be nearer to a distal side (the rear side in FIG. 10) of the arm portion 231 than the axis insertion hole 232 and pass through the arm portion 231 in the thickness direction thereof. Further, the through-hole 233 is configured to receive the end portion 282 of the torsion spring 280. The engaging portion 234 is a rectangular columnar member formed so as to protrude from a proximal-side end portion of the arm portion 231 toward the outside and configured to engage with an engaging portion 256 of the rotating member 250 described later during the motion of the power generator 200 described with reference to FIGS. 14 and 15.

In the state shown in FIG. 13 in that the power generator 200 has been assembled, the first axis 242*a* of the first axis member 240*a* is inserted into the axis insertion hole 232 of the operating portion 230, the end portion 282 of the torsion spring 280 is inserted into the through-hole 233 and the lower surface of the operating portion 230 is supported by the first support portion 241*a* of the first axis member 240*a*. With this configuration, it is possible to support the operating portion 230 so that the operating portion 230 can be pivotally moved with respect to the case 210 around the first axis 242*a*.

Rotating Member 250

The rotating member 250 is provided in the case 210 so as to be rotated by the operating portion 230 and supports the magnet assembly 260 (the magnets 261*a*, 261*b*).

As shown in FIG. 12, the rotating member 250 includes a main body 251, a columnar spring fitting axis 252 provided on an upper surface of the main body 251, an axis insertion hole 253 formed in a substantially central portion of an upper surface of the spring fitting axis 252, a magnet assembly attachment portion 254 formed on a right-side surface of the main body 251, a pair of spring end portion support portions 255*a*, 255*b* (see FIG. 13) formed on a surface opposite to the surface of the main body 251 on which the magnet assembly attachment portion 254 is formed and the engaging portion 256 formed so as to protrude from a left-end surface of the main body 251 toward the outside.

The spring fitting axis 252 is provided on the upper surface of the main body 251 and inserted into a central hollow portion of the upper torsion spring 270*a* in the state shown in FIG. 13 in that the power generator 200 has been assembled. A height of the spring fitting axis 252 is substantially equal to a height of the central hollow portion of the upper torsion spring 270*a*.

The axis insertion hole 253 is formed in the substantially central portion of the upper surface of the spring fitting axis 252 so as to pass through the main body 251 and the spring fitting axis 252 in the thickness direction thereof. In the state shown in FIG. 13 in that the power generator 200 has been assembled, the second axis 242*b* is inserted into the axis insertion hole 253.

The magnet assembly attachment portion 254 is a concave portion formed on the right-side surface of the main body 251 and has a shape corresponding to the shape of the magnet assembly 260. In the state shown in FIG. 13 in that the power generator 200 has been assembled, the magnet assembly 260 is attached to the magnet assembly attachment portion 254.

As shown in FIG. 13, the pair of spring end portion support portion 255*a*, 255*b* are concave portions formed so as to be vertically symmetry through the spring fitting axis 252 in a top view of the rotating member 250. In the state shown in FIG. 13 in that the power generator 200 has been assembled, an end portion 271*b* of the lower torsion spring 270*b* is inserted into the spring end portion support portion 255*a* and an end portion 272*a* of the upper torsion spring 270*a* is inserted into the spring end portion support portion 255*b*. With this configuration, the rotating member 250 is supported by the upper torsion spring 270*a* and the lower torsion spring 270*b*.

The engaging portion 256 is formed so as to protrude from the left-side surface of the main body 251 toward the outside and configured to engage with the engaging portion 234 of the operating portion 230 during the motion of the power generator 200 described with reference to FIGS. 14 and 15.

In the state shown in FIG. 13 in that the power generator 200 has been assembled, the end portion 272*a* of the upper torsion spring 270*a* is inserted into the spring end portion support portion 255*b*, the end portion 271*b* of the lower torsion spring 270*b* is inserted into the spring end portion support portion 255*a* and the second axis 242*b* is inserted into the axis insertion hole 253 of the rotating member 250. With this configuration, it is possible to rotatably support the rotating member 250.

The rotating member 250 is formed with a non-magnetic material or a weakly magnetic material. Among non-magnetic materials and weak magnetic materials, it is preferable to form the rotating member 250 with a POM (polyacetal) or a non-magnetic metallic material. By forming the rotating member 250 with the POM or the non-magnetic metallic material, it is possible to improve slidability of the rotating member 250. Further, each component of the rotating member 250 described above may be formed integrally with each other or may be formed as different components.

Magnet Assembly 260

In the state shown in FIG. 13 in that the power generator 200 has been assembled, the magnet assembly 260 is attached to the magnet assembly attachment portion 254 of the rotating member 250. Thus, when the rotating member 250 is rotated by the operating portion 230, the magnet assembly 260 is rotated and moved with respect to the coil 222 around the second axis 242*b*. As shown in FIGS. 10 and 12, the magnet assembly 260 includes a yoke 262 attached to the magnet assembly attachment portion 254, and the first magnet 261*a* and the second magnet 261*b* attached to the yoke 262.

Since each of the magnets 261*a*, 261*b* and the yoke 262 has the same configuration as each of the magnets 151*a*, 151*b* and the yoke 152 of the first embodiment, description for the magnets 261*a*, 261*b* and the yoke 262 is omitted in the following description.

When the rotating member 250 is rotated by the operating portion 230 to relatively rotate and move the magnet assembly 260 with respect to the coil 222 around the second axis 242*b*, the magnets 261*a*, 261*b* are relatively rotated and moved with respect to the coil 222 around the second axis 242*b*. When the magnets 261*a*, 261*b* are relatively moved with respect to the coil 222, the number of the lines of magnetic force (the density of the magnetic flux) passing through the coil 222 varies, thereby generating the electric power in the coil 222.

Thus, in the power generator 200 of the present embodiments, the coil 222 (the coil assembly 220) and the magnets 261*a*, 261*b* (the magnet assembly 260) relatively rotated and moved with respect to the coil 222 form a power generating unit for generating the electric power.

Upper Torsion Spring 270a and Lower Torsion Spring 270b

Each of the upper torsion spring 270a and the lower torsion spring 270b has the same configuration with each other and is arranged so as to be vertically symmetric through the rotating member 250 in the state shown in FIG. 13 in that the power generator 200 has been assembled.

In the state shown in FIG. 13 in that the power generator 200 has been assembled, the lower torsion spring 270b is placed on the lower plate 211 of the case 210 and positioned below the rotating member 250. Further, the second support portion 241b of the second axis member 240b is inserted into the central hollow portion of the lower torsion spring 270b. Furthermore, the one end portion 271b of the lower torsion spring 270b is inserted into the spring end portion support portion 255a of the rotating member 250 to support the one end portion 271b of the lower torsion spring 270b and the other end portion 272b of the lower torsion spring 270b is engaged with an inner surface of the movable portion containing portion 213 of the case 210 to support the other end portion 272b of the lower torsion spring 270b.

On the other hand, in the state shown in FIG. 13 in that the power generator 200 has been assembled, the upper torsion spring 270a is placed on the upper surface of the main body 251 of the rotating member 250 and positioned above the rotating member 250. Further, the spring fitting axis 252 of the rotating member 250 is inserted into the central hollow portion of the upper torsion spring 270a. Furthermore, the one end portion 271a of the upper torsion spring 270a is engaged with the inner surface of the movable portion containing portion 213 of the case 210 to support the one end portion 271a of the upper torsion spring 270a and the other end portion 272a of the upper torsion spring 270a is inserted into the spring end portion support portion 255b of the rotating member 250 to support the other end portion 272a of the upper torsion spring 270a.

With this configuration, when the operating portion 230 is pivotally moved by applying the external force and the rotating member 250 is rotated around the second axis 242b by the operating portion 230, the applied external force is stored in the upper torsion spring 270a and the lower torsion spring 270b as elastic energy. Further, the upper torsion spring 270a and the lower torsion spring 270b can release the stored elastic energy to rapidly rotate the rotating member 250 around the second axis 242b.

Since the magnet assembly 260 is attached to the magnet assembly attachment portion 254 of the rotating member 250 as described above, the magnets 261a, 261b of the magnet assembly 260 are also rapidly rotated and moved with respect to the coil 222 around the second axis 242b when the rotating member 250 is rapidly rotated around the second axis 242b.

Thus, in this embodiment, each of the upper torsion spring 270a and the lower torsion spring 270b serves as an elastic member for storing the external force applied through the operating portion 230 as the elastic energy and releasing the stored elastic energy to relatively rotate and move the magnets 261a, 261b with respect to the coil 222.

Torsion Spring 280

The torsion spring 280 is a member for holding the operating portion 230 at a predetermined initial position. In the state shown in FIG. 13 in that the power generator 200 has been assembled, the torsion spring 280 is placed on the lower plate 211 of the case 210 and positioned below the operating portion 230. Further, the first support portion 241a of the first axis member 240a is inserted into the central hollow portion of the torsion spring 280. Further, the one end portion 281 of the torsion spring 280 is engaged with the inner surface of the movable portion containing portion 213 of the case 210 to support the one end portion 281 of the torsion spring 280 and the other end portion 282 of the torsion spring 280 is inserted into the through-hole 233 of the operating portion 230 to support the other end portion 282 of the torsion spring 280. With this configuration, it is possible to hold the operating portion 230 at the predetermined initial position.

Motion of the Power Generator 200

Next, description will be given to the motion of the power generator 200 with reference to FIGS. 14 and 15. In this regard, the upper plate 212 of the power generator 200 is omitted for showing the internal structure of the power generator 200 in FIGS. 14 and 15.

Initial State

FIG. 14A shows a top view of the power generator 200 in an initial state that the power generator 200 has been assembled and the external force is not applied to the operating portion 230. As shown in FIG. 14A, in the initial state that the external force is not applied to the operating portion 230, the engaging portion 234 of the operating portion 230 is separated from the engaging portion 256 of the rotating member 250 by a predetermined distance. Further, the first magnet 261a and the second magnet 261b are positioned so as to be separated from the external core portion 214 of the case 210 and the magnetic core 223 of the coil assembly 220 by a predetermined distance.

In the initial state, the first magnet 261a is positioned between the first bent portion 2144 of the first plate-like portion 2141 of the external core portion 214 and the magnetic core 223 of the coil assembly 220 and the second magnet 261b is positioned between the second bent portion 2145 of the second plate-like portion 2142 of the external core portion 214 and the magnetic core 223 of the coil assembly 220.

The External Force is Applied

FIG. 14B shows the top view of the power generator 200 in a state that the external force is applied to the operating portion 230 by the operator and the operating portion 230 is pivotally moved in the counter-clockwise direction around the first axis 242a.

When the operator presses the operating portion 230 in a direction indicated by an arrow line in FIG. 14B to apply the external force, the operating portion 230 is pivotally moved in the counter-clockwise direction around the first axis 242a. When the operating portion 230 is pivotally moved in the counter-clockwise direction, the engaging portion 234 of the operating portion 230 engages with the engaging portion 256 of the rotating member 250. As a result, the rotating member 250 is rotated in the clockwise direction around the second axis 242b by the operating portion 230. At this time, the magnets 261a, 261b attached to the rotating member 250 are also relatively rotated and moved with respect to the coil 222 in the clockwise direction (in a first direction) around the second axis 242b.

The engagement between the engaging portion 234 of the operating portion 230 and the engaging portion 256 of the rotating member 250 is kept until the magnets 261a, 261b attached to the rotating member 250 reach a first engagement release position due to the rotational movement. When the rotating member 250 is rotated, the upper torsion spring 270a and the lower torsion spring 270b supporting the rotating member 250 are elastically deformed, and thereby the applied external force is stored in the upper torsion spring 270a and the lower torsion spring 270b as the elastic energy. Further, at this time, the torsion spring 280 supporting the operating portion 230 is also elastically deformed as is the case with the upper torsion spring 270a and the lower torsion spring 270b, and thereby the applied external force is stored in the torsion spring 280 as the elastic energy.

In this regard, when the operating portion 230 is pivotally moved in the counter-clockwise direction by the applied external force, the magnets 261a, 261b are relatively rotated and moved with respect to the coil 222 and thus the number of the lines of magnetic force (the density of the magnetic flux) passing through the coil 222 varies. However, since a speed of the rotational movement of the magnets 261a, 261b due to the external force applied by the operator is slower than a time scale of an electromagnetic phenomenon and is not stable, an amount of the electric power generated in the coil 222 by this rotational movement is significantly small. Thus, the electric power generated in the coil 222 when the magnets 261a, 261b are relatively rotated and moved with respect to the coil 222 by the external force applied by the operator does not substantially contribute to the amount of the electric power generated by the power generator 200.

The Engagement is Released and First Power Generation is Started

FIG. 14C shows the top view of the power generator 200 when the magnets 261a, 261b attached to the rotating member 250 reach the first engagement release position and the engagement between the engaging portion 234 of the operating portion 230 and the engaging portion 256 of the rotating member 250 is released.

When the engagement between the engaging portion 234 of the operating portion 230 and the engaging portion 256 of the rotating member 250 is released, the elastic energy stored in the upper torsion spring 270a and the lower torsion spring 270b is released to rapidly rotate the rotating member 250 in the counter-clockwise direction around the second axis 242b. At this time, the magnets 261a, 261b attached to the rotating member 250 are also rapidly rotated and moved with respect to the coil 222 in the counter-clockwise direction around the second axis 242b. In this regard, the applying of the external force to the operating portion 230 is not released even after the engagement between the engaging portion 234 of the operating portion 230 and the engaging portion 256 of the rotating member 250 is released.

As shown in FIG. 14D, due to the rotational movement of the magnets 261a, 261b, the first magnet 261a takes a closest position with respect to the first bent portion 2144 of the first plate-like portion 2141 of the external core portion 214 and the second magnet 261b takes a closest position with respect to the magnetic core 223 (the coil 222) of the coil assembly 220. At this time, first power generation of the power generator 200 is substantially started.

The magnets 261a, 261b are sufficiently accelerated after the engagement between the engaging portion 234 of the operating portion 230 and the engaging portion 256 of the rotating member 250 is released in the state shown in FIG. 14C and before the power generation of the power generator 200 is started in the state shown in FIG. 14D. Namely, it is possible to consider a moving zone of the magnets 261a, 261b while the power generator 200 of this embodiment shifts from the state shown in FIG. 14C to the state shown in FIG. 14D as a first accelerating zone for the magnets 261a, 261b.

Further, since a distance between the first magnet 261a and the first bent portion 2144 and a distance between the second magnet 261b and the magnetic core 223 of the coil assembly 220 are large in this first accelerating zone, rotary torque (rotary resistance) caused by the magnets 261a, 261b and the magnetic members (the coil assembly 220 and the external core portion 214) is small Thus, it is possible to efficiently accelerate the magnets 261a, 261b in this first accelerating zone.

By forming the first accelerating zone for the magnets 261a, 261b described above in the power generator 200, the magnets 261a, 261b are sufficiently accelerated. Thus, it is possible to allow the first magnet 261a to take the closest position with respect to the first bent portion 2144 and allow the second magnet 261b to take the closest position with respect to the magnetic core 223 (the coil 222) of the coil assembly 220 at the same time in a state that the speed of the rotational movement of the magnets 261a, 261b becomes substantially maximum. With this configuration, it is possible to sufficiently increase the variation of the lines of magnetic force (the magnetic flux) passing through the coil 222 due to the rotational movement (the relative movement) of the magnets 261a, 261b with respect to the coil 222.

In this regard, the language of "the speed of the rotational movement of the magnets 261a, 261b becomes substantially maximum" used herein means that the speed of the rotational movement of the magnets 261a, 261b becomes equal to or more than 80% of the maximum speed of the rotational movement of the magnets 261a, 261b, and more specifically means that the speed of the rotational movement of the magnets 261a, 261b becomes equal to or more than 85% of the maximum speed of the rotational movement of the magnets 261a, 261b as is the case with the first embodiment.

In this regard, even while the magnets 261a, 261b are accelerated in the first accelerating zone, the magnets 261a, 261b are relatively rotated and moved with respect to the coil 222 and thus the number of the lines of magnetic force (the density of the magnetic flux) passing through the coil 222 varies. However, since the speed of the rotational movement of the magnets 261a, 261b in the first accelerating zone is slower than the time scale of the electromagnetic phenomenon and the distance between the first magnet 261a and the first bent portion 2144 and the distance between the second magnet 261b and the magnetic core 223 of the coil assembly 220 are large, the electric power generated in the coil 222 by this rotational movement in the first accelerating zone is significantly small Thus, the electric power generated in the coil 222 when the magnets 261a, 261b are relatively rotated and moved with respect to the coil 222 in the first accelerating zone does not substantially contribute to the amount of the generated electric power of the power generator 200.

In the state shown in FIG. 14D, the magnetic circuit is formed by the second magnet 261b, the magnetic core 223, the external core portion 214 (the connecting portion 2143 and the first plate-like portion 2141), the first magnet 261a and the yoke 262. In the state shown in FIG. 14D, the lines of magnetic force flowing in the magnetic circuit in the clockwise direction pass through the coil 222 from the left side to the right side.

Further, when the first magnet 261a takes the closest position with respect to the first bent portion 2144, a right-side end surface (a south pole plane) of the first magnet 261a faces a left-side end surface of the first bent portion 2144. On the other hand, when the second magnet 261b takes the closest position with respect to the magnetic core 223 (the coil 222), a right-side end surface (a north pole plane) of the second magnet 261b approximately horizontally faces a left-side end surface of magnetic core 223. With this configuration, diffusion of the lines of magnetic force between the first magnet 261a and the first bent portion 2144 and between the second magnet 261b and the magnetic core 223 of the coil assembly 220 is prevented. Thus, it is possible to improve efficiency of the power generation of the power generator 200.

The First Power Generation Finishes

FIG. 14E shows the top view of the power generator 200 at the time when the first power generation of the power generator 200 finishes.

When the rotating member 250 is further rotated in the counter-clockwise direction in the state shown in FIG. 14D, the power generator 200 shifts to a state shown in FIG. 14E. When the power generator 200 shifts to the state shown in the FIG. 14E, the first power generation of the power generator 200 substantially finishes.

In the state shown in FIG. 14E, the first magnet 261a takes a closest position with respect to the magnetic core 223 (the coil 222) of the coil assembly 220 and the second magnet 261b takes a closest position with respect to the second bent portion 2145 of the second plate-like portion 2142 of the external core portion 214.

In this regard, while the power generator 200 shifts from the state shown in FIG. 14D to the state shown in FIG. 14E, that is in a first power generating zone of the power generator 200, the speed of the rotational movement (the relative movement) of the magnets 261a, 261b with respect to the coil 222 is kept substantially maximum. Thus, it is possible to sufficiently increase the variation of the number of magnetic force (the density of the magnetic flux) passing through the coil 222 in the first power generating zone of the power generator 200.

In the state shown in FIG. 14E, the magnetic circuit is formed by the second magnet 261b, the external core portion 214 (the second plate-like portion 2142 and the connecting portion 2143), the magnetic core 223, the first magnet 261a and the yoke 262. In the state shown in FIG. 14E, the lines of magnetic force flowing in the magnetic circuit in the clockwise direction pass through the coil 222 from the right side to the left side. Since the lines of magnetic force pass through the coil 222 from the left side to the right side in the state shown in FIG. 14D, a direction of the lines of magnetic force passing through the coil 222 is inverted in the first power generating zone in which the power generator 200 shifts from the state shown in FIG. 14D to the state shown in FIG. 14E. Thus, it is possible to sufficiently increase the variation of the lines of the magnetic force (the density of the magnetic flux) passing through the coil 222 in the first power generating zone of the power generator 200.

Further, when the first magnet 261a takes the closest position with respect to the magnetic core 223 (the coil 222) of the coil assembly 220, the right-side end surface (the south pole plane) of the first magnet 261a approximately horizontally faces the left-side end surface of the magnetic core 223 of the coil assembly 220. On the other hand, when the second magnet 261b takes the closest position with respect to the second bent portion 2145, the right-side end surface (the north pole plane) of the second magnet 261b faces a left-side end surface of the second bent portion 2145. With this configuration, diffusion of the lines of magnetic force between the first magnet 261a and the magnetic core 223 of the coil assembly 220 and between the second magnet 261b and the second bent portion 2145 is prevented. Thus, it is possible to improve the efficiency of the power generation of the power generator 200.

After the state shown in FIG. 14E, the speed of the rotation of the rotating member 250 in the counter-clockwise direction decreases due to rotary torque (rotary resistance) of the upper torsion spring 270a and the lower torsion spring 270b. As a result, the rotation of the rotating member 250 in the counter-clockwise direction is stopped. When the rotation of the rotating member 250 in the counter-clockwise direction is stopped, the rotating member 250 is rotated in the clockwise direction by the upper torsion spring 270a and the lower torsion spring 270b and thus the rotating member 250 returns to the initial state.

Even after the state shown in FIG. 14E and before the rotating member 250 returns to the initial state, the magnets 261a, 261b are relatively rotated and moved with respect to the coil 222 and thus the number of the lines of magnetic force (the density of the magnetic flux) passing through the coil 222 varies. However, the speed of the rotational movement of the magnets 261a, 261b decreases after the state shown in FIG. 14E. In addition, a distance between the first magnet 261a and the magnetic core 223 of the coil assembly 220 and a distance between the second magnet 261b and the second bent portion 2145 increase. Thus, the electric power generated in the coil 222 when the magnets 261a, 261b are relatively rotated and moved with respect to the coil 222 after the state shown in FIG. 14E and before the rotating member 250 returns to the initial state does not substantially contribute the amount of the generated electric power of the power generator 200. Thus, the first power generation of the power generator 200 substantially finishes in the state shown in FIG. 14E.

Re-Engagement

FIG. 14F and FIG. 15A show the top view of the power generator 200 in a state that the applying of the external force to the operating portion 230 is released and the engaging portion 234 of the operating portion 230 again engages with the engaging portion 256 of the rotating member 250.

After the rotating member 250 returns to the initial state, the applying of the external force to the operating portion 230 by the operator is released. When the applying of the external force to the operating portion 230 is released, the elastic energy stored in the torsion spring 280 is released to pivotally move the operating portion 230 in the clockwise direction so that the operating portion 230 returns to the predetermined initial position and thus the engaging portion 234 of the operating portion 230 again engages with the engaging portion 256 of the rotating member 250. As a result, the power generator 200 shifts to a state shown in FIGS. 14F and 15A.

In the power generator 200 of this embodiment, spring constants of the torsion spring 280, the upper torsion spring 270a and the lower torsion spring 270b and the shapes of the operating portion 230 and the rotating member 250 are adjusted so that rotary torque $N_1=r_1 \times F_1$ applied from the operating portion 230 to the rotating member 250 is larger than rotary torque $N_2=r_2 \times F_2$ applied from the rotating member 250 to the operating portion 230 in the state shown in FIGS. 14F and 15A. In the above equations, "$r_1$" is a distance between a center of the first axis 242a which is the rotational axis for the operating portion 230 and an engagement point between the engaging portion 234 of the operating portion 230 and the engaging portion 256 of the rotating member 250, "$F_1$" is force applied from the torsion spring 280 to the operating portion 230, "$r_2$" is a distance between a center of the second axis 242b which is the rotational axis for the rotating member 250 and an engagement point between the engaging portion 234 of the operating portion 230 and the engaging portion 256 of the rotating member 250 and "$F_2$" is force applied from the upper torsion spring 270a and the lower torsion spring 270b to the rotating member 250.

In the state shown in FIGS. 14F and 15A, the rotary torque $N_1$ applied from the operating portion 230 to the rotating member 250 is larger than the rotary torque $N_2$ applied from the rotating member 250 to the operating portion 230. Thus, after the engaging portion 234 of the operating portion 230 again engages with the engaging portion 256 of the rotating member 250, the operating portion 230 is pivotally moved in the clockwise direction around the first axis 242a and thus the rotating member 250 is rotated in the counter-clockwise direction around the second axis 242b by the operating portion 230. At this time, the magnets 261a, 261b attached to the rotating member 250 are also relatively rotated and moved with respect to the coil 222 in the counter-clock direction (a second direction) around the second axis 242b.

The engagement between the engaging portion 234 of the operating portion 230 and the engaging portion 256 of the rotating member 250 is kept until the magnets 261a, 261b attached to the rotating member 250 reach a second engagement release position due to the rotational movement. In this regard, a magnitude relationship between the rotary torque $N_1$ applied from the operating portion 230 to the rotating member 250 and the rotary torque $N_2$ applied from the rotating member 250 to the operating portion 230 is kept until the magnets 261a, 261b reach the second engagement release position due to the rotational movement.

As is the same with the first power generation, when the rotating member 250 is rotated, the upper torsion spring 270a and the lower torsion spring 270b supporting the rotating member 250 are elastically deformed, and thereby the applied external force is stored in the upper torsion spring 270a and the lower torsion spring 270b as elastic energy.

When the rotating member 250 is rotated in the counter-clockwise direction by the operating portion 230, the magnets 261a, 261b are relatively rotated and moved with respect to the coil 222 and thus the number of the lines of magnetic force (the density of the magnetic flux) passing through the coil 222 varies. However, since the speed of the rotational movement of the magnets 261a, 261b due to the operating portion 230 is slower than the time scale of the electromagnetic phenomenon, an amount of the electric power generated in the coil 222 by this rotational movement is significantly small. Thus, the electric power generated in the coil 222 when the magnets 261a, 261b are relatively rotated and moved with respect to the coil 222 by the operating portion 230 does not substantially contribute to the amount of the electric power generated by the power generator 200.

The Engagement is Released and Second Power Generation is Started

FIG. 15B shows the top view of the power generator 200 when the magnets 261a, 261b attached to the rotating member 250 reach the second engagement release position due to the rotational movement and the engagement between the engaging portion 234 of the operating portion 230 and the engaging portion 256 of the rotating member 250 is released.

When the engagement between the engaging portion 234 of the operating portion 230 and the engaging portion 256 of the rotating member 250 is released, the elastic energy stored in the upper torsion spring 270a and the lower torsion spring 270b is released to rapidly rotate the rotating member 250 in the clockwise direction around the second axis 242b. At this time, the magnets 261a, 261b attached to the rotating member 250 are also rapidly rotated and moved with respect to the coil 222 in the clockwise direction around the second axis 242b.

As shown in FIG. 15C, due to the rotational movement of the magnets 261a, 261b, the first magnet 261a takes the closest position with respect to the magnetic core 223 (the coil 222) of the coil assembly 220 and the second magnet 261b takes the closest position with respect to the second bent portion 2145 of the second plate-like portion 2142 of the external core portion 214. At this time, second power generation of the power generator 200 is substantially started.

The magnets 261a, 261b are sufficiently accelerated after the engagement between the engaging portion 234 of the operating portion 230 and the engaging portion 256 of the rotating member 250 is released in the state shown in FIG. 15B and before the power generation of the power generator 200 is started in the state shown in FIG. 15C. Namely, it is possible to consider a moving zone of the magnets 261a, 261b while the power generator 200 of this embodiment shifts from the state shown in FIG. 15B to the state shown in FIG. 15C as a second accelerating zone for the magnets 261a, 261b.

As is the case with the first accelerating zone, since the distance between the first magnet 261a and the magnetic core 223 of the coil assembly 220 and the distance between the second magnet 261b and the second bent portion 2145 are large in this second accelerating zone, the rotary torque (rotary resistance) caused by the magnets 261a, 261b and the magnetic members (the coil assembly 220 and the external core portion 214) is small. Thus, it is possible to also efficiently accelerate the magnets 261a, 261b in this second accelerating zone.

By forming the second accelerating zone for the magnets 261a, 261b described above in the power generator 200, the magnets 261a, 261b are sufficiently accelerated. Thus, it is possible to allow the first magnet 261a to take the closest position with respect to the magnetic core 223 (the coil 222) of the coil assembly 220 and allow the second magnet 261b to take the closest position with respect to the second bent portion 2145 at the same time in a state that the speed of the rotational movement of the magnets 261a, 261b becomes substantially maximum.

In this regard, even while the magnets 261a, 261b are accelerated in the second accelerating zone, the magnets 261a, 261b are relatively rotated and moved with respect to the coil 222 and thus the number of the lines of magnetic force (the magnetic flux) passing through the coil 222 varies. However, since the speed of the rotational movement of the magnets 261a, 261b in the second accelerating zone is slower than the time scale of the electromagnetic phenomenon and the distance between the first magnet 261a and the magnetic core 223 of the coil assembly 220 and the distance between the second magnet 261b and the second bent portion 2145 are large, the electric power generated in the coil 222 by this rotational movement in the second accelerating zone is significantly small. Thus, the electric power generated in the coil 222 when the magnets 261a, 261b are relatively rotated and moved with respect to the coil 222 in the second accelerating zone does not substantially contribute to the amount of the generated electric power of the power generator 200.

In the state shown in FIG. 15C, the magnetic circuit is formed by the second magnet 261b, the external core portion 214 (the second plate-like portion 2142 and the connecting portion 2143), the magnetic core 223, the first magnet 261a and the yoke 262. In the state shown in FIG. 15C, the lines of magnetic force flowing in the magnetic circuit in the clockwise direction pass through the coil 222 from the right side to the left side.

The Second Power Generation Finishes

FIG. 15D shows the top view of the power generator 200 at the time when the second power generation of the power generator 200 finishes.

When the rotating member 250 is further rotated in the clockwise direction in the state shown in FIG. 15C, the power generator 200 shifts to a state shown in FIG. 15D. When the power generator 200 shifts to the state shown in the FIG. 15D, the second power generation of the power generator 200 substantially finishes.

In the state shown in FIG. 15D, the first magnet 261a takes the closest position with respect to the first bent portion 2144 of the first plate-like portion 2141 of the external core portion 214 and the second magnet 261b takes the closest position with respect to the magnetic core 223 (the coil 222) of the coil assembly 220.

In this regard, while the power generator 200 shifts from the state shown in FIG. 15C to the state shown in FIG. 15D, that is in a second power generating zone of the power generator 200, the speed of the rotational movement (the relative movement) of the magnets 261a, 261b with respect to the coil 222 is kept substantially maximum. Thus, it is possible to sufficiently increase the variation of the number of magnetic force (the density of the magnetic flux) passing through the coil 222 in the second power generating zone of the power generator 200.

In the state shown in FIG. 15D, the magnetic circuit is formed by the second magnet 261b, the magnetic core 223, the external core portion 214 (the connecting portion 2143 and the first plate-like portion 2141), the first magnet 261a and the yoke 262. In the state shown in FIG. 15D, the lines of magnetic force flowing in the magnetic circuit in the clockwise direction pass through the coil 222 from the left side to the right side. Since the lines of magnetic force pass through the coil 222 from the right side to the left side in the state shown in FIG. 15C, the direction of the lines of magnetic force passing through the coil 222 is inverted in the second power generating zone in which the power generator 200 shifts from the state shown in FIG. 15C to the state shown in FIG. 15D. Thus, it is possible to sufficiently increase the variation of the lines of the magnetic force (the density of the magnetic flux) passing through the coil 222 in the second power generating zone of the power generator 200.

After the state shown in FIG. 15D, the speed of the rotation of the rotating member 250 in the clockwise direction decreases due to the rotary torque (rotary resistance) of the upper torsion spring 270a and the lower torsion spring 270b. As a result, the rotation of the rotating member 250 in the clockwise direction is stopped. When the rotation of the rotating member 250 is stopped, the rotating member 250 is rotated in the counter-clockwise direction by the upper torsion spring 270a and the lower torsion spring 270b and thus the rotating member 250 returns to the initial state.

Further, at the same time of the rotation of the rotating member 250 in the counter-clockwise direction, the operating portion 230 is pivotally moved by the torsion spring 280 and thus the operating portion 230 returns to the initial state. FIG. 15E shows the top view of the power generator 200 when both of the operating portion 230 and the rotating member 250 respectively return to the initial states.

As described above, the power generator 200 of this embodiment is configured to perform the two times of the power generation by utilizing the one time of the applying of the external force through the operating portion 230 by the operator. Thus, the power generator 200 of this embodiment can ensure the amount of the generated electric power which is about twice as large as that of the power generator 100 of the first embodiment.

Further, in the power generator 200 of this embodiment, since the rotational direction of the magnets 261a, 261b at the time of the first power generation is different from the rotational direction of the magnets 261a, 261b at the time of the second power generation, positive and negative of the voltage generated in the coil 222 changes between the first power generation and the second power generation. Thus, by determining the positive and negative of the voltage generated in the coil 222, it is possible to determine whether the obtained electric power is generated by the first power generation or the obtained electric power is generated by the second power generation.

Further, as described above, the power generating principle of the power generator 200 of this embodiment is based on the movement that the two magnets are relatively rotated and moved with respect to the coil around the predetermined axis by the elastic member and thus the power generating principle of the power generator 200 of this embodiment is the same as the power generating principle of the power generator 100 of the first embodiment. Thus, the power generator 200 of this embodiment can also provide the same effect as the effect obtained by the power generator 100 of the described first embodiment.

Hereinbefore, each of the power generator 100 and the power generator 200 is described as one of aspects of the present embodiments. In another aspect of the present embodiments, the present embodiments is an electronic device including the power generator 100 or the power generator 200 described above and an electronic circuit driven by the electric power generated by the power generator 100 or the power generator 200.

Functions performed by the electronic device is not particularly limited to a specific kind. For example, the electronic device may perform a wireless transmitting function for wirelessly transmitting a signal for turning an external device such as an illuminating device on/off by utilizing the electric power supplied from the power generator 100 or the power generator 200. In this case, the electronic device is configured to wirelessly transmit the signal to the external device with a small amount of the electric power (for example, about 200 μJ) generated by the power generator 100 or the power generator 200.

In this regard, although the electronic circuit of the electronic device of the present embodiments is provided outside the power generator 100 or the power generator 200, the present embodiments is not limited thereto. For example, the electronic circuit may be provided in the power generator 100 or the power generator 200.

Although the power generator and the electronic device of the present embodiments have been described with reference to the preferred embodiments shown in the accompanying drawings, the present embodiments is not limited thereto. The configuration of each component of the present embodiments may be possibly replaced with other arbitrary configurations having equivalent functions. It may be also possible to add other optional components to the present embodiments.

Further, the number and the kinds of the components of the power generators of the first embodiment and the second embodiment are merely provided for the illustration of the present embodiments, the present embodiments is not necessarily limited thereto. The scope of the present embodiments contains alternations and changes of the described structures in which arbitrary constitutional components are added or combined or arbitrary constitutional components are omitted without meaningfully departing from the principle and the spirit of the present embodiments.

For example, it may be also possible to combine any of the components of the power generators according to the first embodiment and the second embodiment of the present embodiments in an appropriate manner. Further, although the number of the magnets in the first embodiment and the second embodiment is two, the present embodiments is not limited thereto. The number of the magnets used in the power generators of the first embodiment and the second embodiment can be arbitrarily changed depending on the spring constants of the elastic members, the amount of the electric power required for driving the electronic circuit of the electronic device, the strength of the magnetic force of the magnets and the like.

For example, in a case where the amount of the electric power required for driving the electronic circuit of the electronic device is small, the number of the magnets may be one. On the other hand, in a case where the amount of the electric power required for driving the electronic circuit of the electronic device is large, the number of the magnets may be three or more. In the case where the number of the magnets is one, three or more, it is possible to use the coil, the magnetic core and the external core with the number corresponding to the number of the magnets in the power generator.

Further, although the torsion spring is used as the elastic member in each of the embodiments, the present embodiments is not limited thereto. It is possible to use any elastic mechanism such as a spring having another configuration, a rubber and an air cylinder as the elastic member.

Further, in the power generator 200 of the described second embodiment, although the operating portion 230 is pivotally moved so as to return to the predetermined initial position after the first power generation finishes, the present embodiments is not limited thereto. For example, the torsion spring 280 may be omitted by forming the operating portion 230 with a locker switch for performing switching between ON/OFF with a manual operation. In this case, the operating portion 230 (the locker switch) is manually operated after the first power generation finishes and the operating portion 230 is pivotally moved so as to return to the predetermined initial position. Even in such an aspect, the operating portion 230 can be again engaged with the rotating member 250 after the first power generation finishes to perform the second power generation.

What is claimed is:
1. A power generator for generating electric power by utilizing external force, comprising:
    a case;
    a coil fixedly provided in the case;
    at least one magnet provided in the case so that the magnet can be relatively rotated and moved with respect to the coil around a predetermined rotational axis;
    an operating portion which is provided so that the operating portion can be pivotally moved with respect to the case and pivotally operated to apply the external force; and
    an elastic member for storing the external force applied through the operating portion as elastic energy and releasing the stored elastic energy to relatively rotate and move the magnet with respect to the coil,
    wherein the power generator is configured to generate the electric power when the magnet is relatively rotated and moved with respect to the coil around the predetermined rotational axis,
    wherein the magnet is attached to a rotating member provided so as to be rotated by the operating portion,
    wherein the operating portion is configured to engage with the rotating member while the magnet is rotated and moved in a first direction by rotation of the rotating member to reach a first engagement release position and release engagement with the rotating member when the magnet reaches the first engagement release position,
    wherein the elastic member is configured to store the elastic energy while the magnet is rotated and moved in the first direction by the rotation of the rotating member and release the elastic energy to rotate and move the magnet when the engagement between the operating portion and the rotating member is released,
    wherein the operating portion can be pivotally moved so as to return to a predetermined initial position after the engagement between the operating portion and the rotating member has been released,
    wherein the operating portion is configured to again engage with the rotating member to rotate the rotating member in a second direction opposite to the first direction when the operating portion is pivotally moved so as to return to the predetermined initial position, and
    wherein the operating portion is configured to engage with the rotating member while the magnet is rotated and moved in the second direction by rotation of the rotating member in the second direction to reach a second engagement release position and release engagement with the rotating member when the magnet reaches the second engagement release position.

2. The power generator as claimed in claim 1, wherein the magnet takes a closest position with respect to the coil when a speed of rotational movement of the magnet due to the elastic member becomes substantially maximum.

3. The power generator as claimed in claim 2, further comprising a magnetic core inserted in a central hollow portion of the coil,
    wherein an end surface of the magnet approximately horizontally faces an end surface of the magnetic core when the speed of the rotational movement of the magnet becomes substantially maximum.

4. The power generator as claimed in claim 2, wherein the speed of the rotational movement of the magnet when the magnet takes the closest position with respect to the coil is equal to or more than 80% of a maximum speed of the rotational movement of the magnet.

5. The power generator as claimed in claim 1, wherein the case has an external core portion which is constituted of a pair of plate-like portions facing each other and a connecting portion for connecting the pair of plate-like portions and formed with a magnetic material, and
    wherein the coil is provided between the pair of plate-like portions of the external core portion.

6. The power generator as claimed in claim 5, wherein the at least one magnet contains two magnets supported so as to be relatively rotated and moved with respect to the coil around the predetermined rotational axis, and
    wherein the two magnets are provided so that one of the two magnets takes a closest position with respect to an end portion of one of the pair of plate-like portions of the external core portion when the other one of the two magnets takes a closest position with respect to the coil.

7. The power generator as claimed in claim 6, wherein each of the pair of plate-like portions of the case is configured so that the one of the two magnets faces the end portion of the one of the pair of plate-like portions when the other one of the two magnets takes a closest position with respect to the coil.

8. The power generator as claimed in claim 1, further comprising a yoke provided so as to be relatively rotated and moved with respect to the coil together with the at least one magnet around the predetermined rotational axis, wherein the at least one magnet is provided on the yoke.

9. The power generator as claimed in claim 1, wherein the elastic member is configured to store elastic energy while the magnet is rotated and moved in the second direction by the rotation of the rotating member and release the elastic energy to rotate and move the magnet when the engagement between the operating portion and the rotating member is released.

10. An electronic device comprising:
the power generator defined by claim 1; and
an electronic circuit driven by the power generator.

* * * * *